US009950386B2

(12) United States Patent
Cooper et al.

(10) Patent No.: US 9,950,386 B2
(45) Date of Patent: Apr. 24, 2018

(54) METHOD AND END ASSEMBLY FOR WELDING DEVICE

(71) Applicant: ELCo Enterprises, Inc., Jackson, MI (US)

(72) Inventors: Edward L Cooper, Clarklake, MI (US); Steven J Hayes, Addison, MI (US)

(73) Assignee: ELCo Enterprises, Inc., Jackson, MI (US)

( * ) Notice: Subject to any disclaimer, the term of this patent is extended or adjusted under 35 U.S.C. 154(b) by 655 days.

(21) Appl. No.: 14/224,942

(22) Filed: Mar. 25, 2014

(65) Prior Publication Data

US 2015/0273615 A1    Oct. 1, 2015

(51) Int. Cl.
*B23K 9/16*        (2006.01)
*B23K 9/29*        (2006.01)
*B23K 9/26*        (2006.01)

(52) U.S. Cl.
CPC ............... *B23K 9/295* (2013.01); *B23K 9/26* (2013.01)

(58) Field of Classification Search
CPC ............................... B23K 9/173; B23K 9/295
USPC .......... 219/137.2, 137.31, 137.41, 137.42, 219/137.44, 137.61
See application file for complete search history.

(56) References Cited

U.S. PATENT DOCUMENTS

| | | |
|---|---|---|
| 3,676,640 A | 7/1972 | Bernard et al. |
| 4,529,863 A | 7/1985 | Lebel |
| 5,097,108 A * | 3/1992 | Hamal .................. B23K 9/013 219/70 |
| 5,726,420 A | 3/1998 | Lajoie |
| 5,760,373 A | 6/1998 | Colling |
| 5,844,201 A * | 12/1998 | Dibacco .................. B23K 9/29 219/136 |
| 6,075,227 A | 6/2000 | Lajoie |
| 6,225,599 B1 | 5/2001 | Altekruse |
| 6,307,179 B1 | 10/2001 | Walters |
| 6,444,950 B1 | 9/2002 | Altekruse et al. |
| 6,525,297 B2 | 2/2003 | Doherty |
| 6,720,528 B1 | 4/2004 | Matiash et al. |
| 6,744,013 B2 | 6/2004 | Jones |

(Continued)

FOREIGN PATENT DOCUMENTS

| | | |
|---|---|---|
| EP | 1 388 388 A1 | 2/2004 |
| JP | S59178183 A | 10/1984 |

(Continued)

OTHER PUBLICATIONS

European Patent Office, Rijswijk, Netherlands, International Search Report of International Application No. PCT/US2015/022475, mailed Aug. 7, 2015, 5 pages.

*Primary Examiner* — Dana Ross
*Assistant Examiner* — Ayub Maye
(74) *Attorney, Agent, or Firm* — Brinks Gilson & Lione

(57) ABSTRACT

An end assembly for use with a welding device having a chamber between the diffuser sleeve and the insert which allows for cooling the insert and for controlling the flow of gas through the end assembly. Some of the components of the end assembly such as the contact tip, insert and gooseneck are constructed of a conductive material which are securely held together in contact by a diffuser sleeve constructed of a non-conductive material. The end assembly provides better conductivity of the current through the end assembly for use of less energy during welding.

35 Claims, 10 Drawing Sheets

(56) References Cited

U.S. PATENT DOCUMENTS

| | | | |
|---|---|---|---|
| 6,847,009 B2 | 1/2005 | Stuart et al. | |
| 6,924,461 B2 | 8/2005 | Matiash | |
| 7,105,775 B2 | 9/2006 | Giese | |
| 7,176,412 B2 | 2/2007 | Wells | |
| 7,381,923 B2 | 6/2008 | Gordon et al. | |
| 7,576,300 B2 | 8/2009 | Giese | |
| 7,663,074 B2 | 2/2010 | Wells | |
| 8,304,693 B2 | 11/2012 | Ma | |
| 8,450,646 B2 | 5/2013 | Ma et al. | |
| 8,633,422 B2 | 1/2014 | Giese | |
| 9,138,824 B2 | 9/2015 | Giese | |
| 9,364,915 B2 | 6/2016 | Meess et al. | |
| 2005/0218132 A1* | 10/2005 | Wells | B23K 9/32 219/137.61 |
| 2006/0289413 A1* | 12/2006 | Eberle | B23K 9/295 219/137.31 |
| 2007/0246445 A1* | 10/2007 | Kachline | B23K 9/173 219/74 |
| 2008/0314876 A1* | 12/2008 | Pinsonneault | B23K 9/173 219/74 |
| 2009/0045183 A1 | 2/2009 | Artelsmair et al. | |
| 2009/0071942 A1* | 3/2009 | Kachline | B23K 9/173 219/74 |
| 2009/0107958 A1 | 4/2009 | Khakhalev | |
| 2011/0062130 A1* | 3/2011 | Barker | B23K 9/32 219/130.1 |
| 2014/0021183 A1 | 1/2014 | Peters | |
| 2015/0190879 A1 | 7/2015 | Kachline | |
| 2015/0360314 A1 | 12/2015 | Kachline | |
| 2016/0039036 A1 | 2/2016 | Meess et al. | |
| 2016/0039037 A1* | 2/2016 | Meess et al. | B23K 9/26 219/137.42 |

FOREIGN PATENT DOCUMENTS

| | | | |
|---|---|---|---|
| JP | H01309787 A | 12/1989 | |
| KR | 101341872 B1 * | 12/2013 | B23K 9/173 |

* cited by examiner

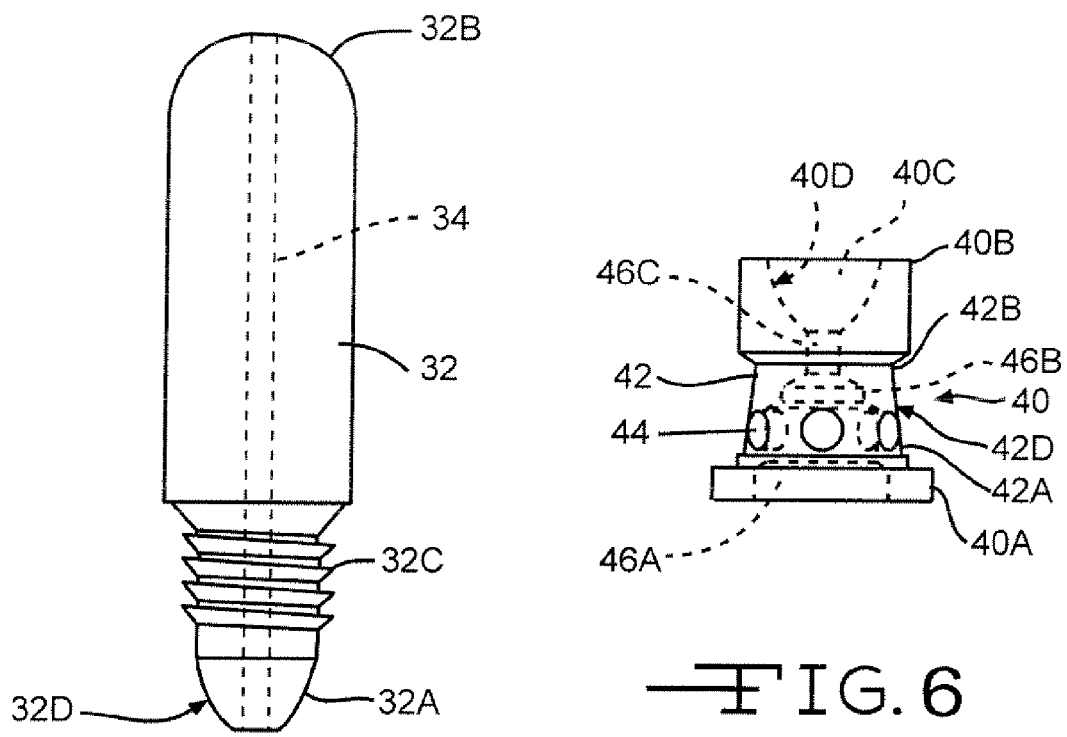
FIG. 5
FIG. 6
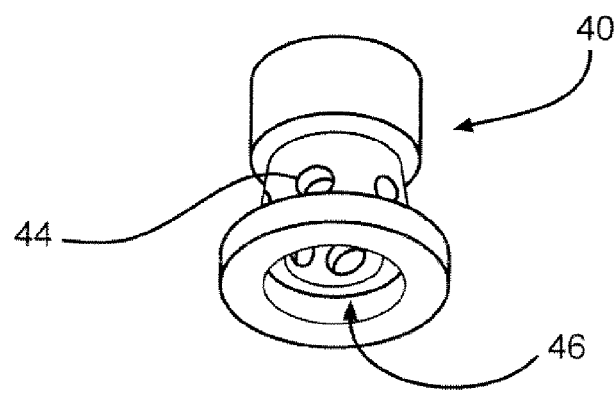
FIG. 7

METHOD AND END ASSEMBLY FOR WELDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

BACKGROUND OF THE INVENTION

Field of the Invention

The present invention relates to an end assembly for use in a welding device. In particular, the present invention relates to end assembly having an insert for controlling the flow of gas during welding. Further the present invention relates to a method for controlling the flow of gas to cool the welding device.

Metal Inert Gas (MIG) welding also referred to as "wire-feed" or Gas Metal Arc Welding (GMAW) utilizes heat from an electrical arc to melt a consumable electrode to form a weld on a workpiece. A MIG welding system typically includes a power supply, a gas supply and an electrode supply connected to a welding device or welding gun. A ground cable is used to connect the workpiece to the power supply. The welding device generally includes a handle, a gooseneck and an end assembly. The welding system can be automatic or semi-automatic and may be manually or robotically controlled. The electrode and gas are coupled through a conduit in the handle and the gooseneck to the end assembly of the welding device. The electrode extends through the contact tip of the end assembly and the gas moves around the contact tip in the nozzle of the end assembly. When the welding device is activated, the electrode is fed through the contact tip toward the workpiece and the gas is directed through the nozzle towards the workpiece. When the electrode is placed adjacent or in contact with the workpiece, the electrode completes an electrical circuit between the power supply and the workpiece allowing current to flow through the electrode to the workpiece. The current produces an arc between the electrode and the workpiece. The heat of the arc melts the electrode and the workpiece in the region surrounding the arc creating a weld puddle. The gas flowing out the nozzle shields the weld puddle from outside contaminants. The type of gas used in MIG welding varies depending on many factors. Noble or inert gases such as Argon are often used. However, Carbon Dioxide ($CO_2$) and a mixture of gases such as $CO_2$ and Argon are also used. Once the electrode is moved away from the workpiece, the electric circuit is broken and the weld puddle cools and solidifies forming a weld.

There remains a need for an end assembly for a welding device which allows for better control of the flow of gas around the weld puddle and which reduces the energy used during welding by providing consistent current flow.

BRIEF SUMMARY OF THE INVENTION

The end assembly of the present invention is used with a welding device for GMAW. The end assembly includes a gooseneck, a diffuser sleeve, an insert, a contact tip and a nozzle. The components of the end assembly are secured together so as to share a common axis. The insert has an inner passageway and a wall extending between the ends. The wall has at least one hole in fluid communication with the inner passageway. The diffuser sleeve has an inner cavity and a wall extending between the ends. The wall has at least one hole in fluid communication with the inner cavity. The insert is positioned in the inner cavity of the diffuser sleeve spaced between the gooseneck and the contact tip. The wall of the insert and the wall of the diffuser sleeve are axially adjacent along the longitudinal axis of the end assembly and are spaced apart in a direction essentially perpendicular to the longitudinal axis of the end assembly so that a chamber is formed between the wall of the insert and the wall of the diffuser sleeve. The hole in the wall of the diffuser sleeve and the hole in the wall of the insert are in fluid communication with the chamber.

In an alternate embodiment, the end assembly includes a gooseneck, a diffuser, a diffuser sleeve, a contact tip, and nozzle. In one embodiment, the diffuser is secured on the second end of the gooseneck. The components of the end assembly are secured together so as to share a common axis. The diffuser has an inner passageway and a wall extending between the ends. The wall has at least one hole in fluid communication with the inner passageway. The diffuser sleeve has an inner cavity and a wall spaced between the ends. The wall of the diffuser sleeve has at least on hole in fluid communication with the inner cavity. The diffuser is positioned in the inner cavity of the diffuser sleeve so that the wall of the diffuser and the wall of the diffuser sleeve are positioned essentially axially adjacent along the longitudinal axis of the end assembly. The wall of the diffuser and the wall the diffuser sleeve are spaced apart in a direction essentially perpendicular to the longitudinal axis of the end assembly so that a chamber is formed between the wall of the diffuser and the wall of the diffuser sleeve. The hole in the wall of the diffuser sleeve and the hole in the wall of the diffuser are in fluid communication with the chamber.

The chamber of either embodiment can have a variety of shapes and sizes. In one embodiment, a size of the chamber varies along the axial length of the chamber between the ends of the chamber. In one embodiment, a length of the chamber between the ends varies. In one embodiment, the chamber is tapered along the axial length of the chamber so that a size or diameter of the chamber adjacent the first end of the diffuser sleeve is less than a size or diameter of the chamber adjacent the second end of the diffuser sleeve. In one embodiment, the hole in the wall of the diffuser sleeve is axially misaligned along the longitudinal axis of the end assembly with the hole in the wall of the insert or in the alternate embodiment, the hole in the diffuser. In one embodiment, the holes in the walls of the insert or in the alternative embodiment, the diffuser have a diameter less than the holes in the wall of the diffuser sleeve.

In use, the gas flows from the gas supply through the passageway of the gooseneck into the inner passageway of the insert or diffuser. The gas flows to the diffuser section of the inner passageway and exits the inner passageway into the chamber through the holes in the wall of the insert or in the alternate embodiment, the diffuser. The gas is held or trapped in the chamber and moves in the chamber. In one embodiment, the chamber changes a velocity of the gas so that a velocity of the gas exiting the chamber is different from a velocity of the gas entering the chamber. In one embodiment, a velocity of the gas is changed by changing a diameter of the hole in the wall of the insert or in the alternate embodiment, the hole in the wall of the diffuser. In one embodiment, a velocity of the gas is changed by changing a diameter of the hole in the wall of the diffuser sleeve. In one embodiment, a velocity of the gas is changed by changing a position of the hole in the wall of the insert or in the alternate embodiment, the hole in the wall of the diffuser. In one embodiment, a velocity of the gas is changed by changing a position of the hole in the wall of the diffuser sleeve. In one embodiment, a velocity of the gas is changed by changing the number of holes in the wall of the insert or in the alternate embodiment, the hole in the wall of the diffuser. In one embodiment, a velocity of the gas is changed by changing the number of holes in the wall of the diffuser sleeve. In one embodiment, the movement of the gas in the chamber and exiting the chamber is controlled by changing the size of the chamber, or changing the position of the holes in the wall of the insert or in the alternate embodiment the diffuser, or changing the position of the holes in the wall of the diffuser sleeve, or changing the number or diameter of the holes in the wall of the insert or in the alternate embodiment the diffuser or changing the number or diameter of the holes in the wall of the diffuser sleeve. The gas exits the chamber though the holes in the wall of the diffuser sleeve into the gas channel of the nozzle. The gas moves along the gas channel to the second end of the nozzle to the work piece. The chamber allows for controlling the flow of gas through the end assembly. Controlling the flow of the gas reduces contaminants in the well puddle allowing for a better weld. Controlling the gas also reduces the amount of gas used during welding. The gas trapped in the chamber also acts to cool the insert or in the alternate embodiment, the diffuser. Cooling the insert or the diffuser also pulls heat away from the contact tip to reduce damage to the contact tip from heat during welding to extend the useful life of the contact tip. In one embodiment, the second end of the insert has an indention with an inner surface and the first end of the contact tip has a radiused end surface and the first end of the contact tip extends into the indention so that the radiused end surface of the contact tip is in contact with the inner surface of the indention to provide better contact between the insert and the contact tip for better heat transfer and for better current conductivity. In one embodiment the contact tip is threaded into the second end of the diffuser sleeve and the second end of the gooseneck is threaded into the first end of the diffuser sleeve and the insert is spaced between and in contact with the contact tip and the gooseneck and the diffuser sleeve securely holds the gooseneck, insert and contact tip in position and in secure constant contact.

In one embodiment, the second end of the gooseneck, the insert and the contact tip are constructed of a conductive material and the diffuser sleeve is constructed on a non-conductive material. In one embodiment, of the alternate embodiment, the gooseneck, the diffuser and contact tip are constructed of a conductive material and the diffuser sleeve is constructed of a non-conductive material. The diffuser sleeve securely holds the second end of the gooseneck, the insert and the contact tip, or in the alternate embodiment the second end of the gooseneck, the diffuser and the contact tip in tight contact so that the components do not move during welding. The tight, secure contact between the conductive gooseneck, the insert and the contact tip or in the alternate embodiment, the gooseneck, the diffuser and the contact tip allows for a constant current flow through the end assembly with less resistance. The constant current flow allows for consistent arc starts during welding and reduces the energy used during welding. In one embodiment, the second end of the gooseneck, the insert and the contact tip are constructed of copper and the diffuser sleeve is constructed of brass. In the alternate embodiment, the gooseneck, the diffuser and the contact tip are constructed of copper and the diffuser sleeve is constructed of brass.

The present invention relates to an end assembly for a welding device comprising, a gooseneck having a passageway; a diffuser sleeve having a first end and a second end with an longitudinal axis extending therebetween, having an inner cavity and having a wall having a hole, the diffuser sleeve connected to the gooseneck, an insert having an inner passageway and a wall having a hole, the insert positioned in the inner cavity of the diffuser sleeve with the wall of the insert axially adjacent and spaced apart from the wall of the diffuser sleeve forming a chamber positioned between the wall of the insert and the wall of the diffuser assembly so that the hole in the wall of the diffuser sleeve and the hole in the wall of the insert are in fluid communication with the chamber; a contact tip positioned in the inner cavity of the diffuser sleeve so that the contact tip extends into the inner cavity of the diffuser sleeve and extends outward from the diffuser sleeve in a direction opposite the insert; and a nozzle having a gas channel and connected to the diffuser sleeve, the nozzle extending outward from the diffuser sleeve in a direction opposite the gooseneck.

Further, the present invention relates to a diffuser assembly for use in a welding device comprising a diffuser sleeve having a first end and a second end with an longitudinal axis extending therebetween, having a wall with a hole and having an inner cavity; an insert having a wall with a hole and an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber.

Still further, the present invention relates to a an end assembly for a welding device comprising a gooseneck having a passageway; a diffuser adjacent the gooseneck, the diffuser having a wall with a hole and an inner passageway in fluid communication with the passageway of the gooseneck; a diffuser sleeve having a first end and a second end with an longitudinal axis extending therebetween, the diffuser sleeve having a wall with a hole and having an inner cavity, the diffuser sleeve connected at the first end to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve so that the hole in the wall of the diffuser sleeve and the hole in the wall of the diffuser are in fluid communication with the chamber; and a contact tip configured to extend into the inner cavity of the diffuser sleeve at the second end of the diffuser sleeve.

Further still, the present invention relates to a In a combination contact tip and diffuser assembly for a welding device, the combination comprising, the diffuser assembly having a diffuser sleeve having a first end and a second end with an longitudinal axis extending therebetween, having a wall with a hole and having an inner cavity, the diffuser assembly having an insert with a first end and a second end, the second end having an indention with a radiused inner surface, the insert having a wall with a hole and having an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber; and the contact tip having a first end and a second end with a center bore extending therethrough, the first end having a radiused outer surface, the contact tip inserted in the inner cavity of the diffuser sleeve at the second end of the diffuser sleeve so that the outer surface of the first end of the contact tip extends into the indention in the second end of the insert and the end surface of the contact tip abuts the inner surface of the insert and the center bore of the contact tip is aligned with the inner passageway of the insert.

Further still, the present invention relates in one embodiment, to a contact tip for welding device comprising a radiused first end and a radiused second end with a center bore extending there through and having buttress threads spaced apart from second end. In one embodiment, the second end of the diffuser sleeve has buttress threads with mate with the buttress threads of the contact tip. In one embodiment, the contact tip has four buttress threads.

Still further, the present invention relates to a method for controlling a flow of gas in a welding device comprising the steps of providing a gas supply; providing a welding gun having an end assembly, the end assembly having a gooseneck with a passageway, a diffuser sleeve connected to the gooseneck having a first end and a second end with an longitudinal axis extending therebetween, the diffuser sleeve having an inner cavity and having a wall with a hole, an insert positioned in the inner cavity of the diffuser sleeve and having an inner passageway and a wall having a hole, the wall of the insert axially adjacent and spaced apart from the wall of the diffuser sleeve forming a chamber positioned between the wall of the insert and the wall of the diffuser assembly so that the hole in the wall of the diffuser sleeve and the hole in the wall of the insert are in fluid communication with the chamber; a contact tip positioned in the inner cavity of the diffuser sleeve so that the contact tip extends into the inner cavity of the diffuser sleeve and extends outward from the diffuser sleeve in a direction opposite the insert; and a nozzle having a gas channel and connected to the diffuser sleeve, the nozzle extending outward from the diffuser sleeve in a direction opposite the gooseneck; supplying the gas to the passageway of the gooseneck so that the gas moves though passageway of gooseneck to the inner passageway of the insert though the hole in the wall of the insert and into the chamber; controlling the gas in the chamber; and controlling the gas exiting the chamber through the hole in the diffuser sleeve and through the gas channel of the nozzle.

Further still, the present invention relates to a method for controlling a flow of gas in a welding device comprising the steps of providing a gas supply; providing a welding gun having a gooseneck with a passageway, diffuser connected to the gooseneck, the diffuser having a wall with a hole and an inner passageway in fluid communication with the passageway, a diffuser sleeve having a first end and a second end with an longitudinal axis extending therebetween, having a wall with a hole and having an inner cavity, the diffuser sleeve connected to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve with the hole in the wall of the diffuser sleeve and the hole in the wall of the diffuser in fluid communication with the chamber, a contact tip configured to extend into the inner cavity of the diffuser sleeve; and a nozzle having a gas channel and configured to connect to the gooseneck and extend outward along the contact tip; supplying the gas to the passageway of the gooseneck so that the gas moves though passageway of gooseneck to the inner passageway of the diffuser though the hole in the wall of the diffuser into the chamber; controlling the gas in the chamber; and controlling the gas exiting the chamber through the hole in the diffuser sleeve and through the gas channel of the nozzle.

Still further, the present invention relates to a method for cooling a contact tip of a welding device which comprises the steps of providing a gas supply; providing an end assembly having a diffuser sleeve with a first end and a second end extending along a longitudinal axis, the diffuser sleeve having a wall with a hole and having an inner cavity; an insert having a wall with a hole and an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber; providing a contact tip in contact with an insert; moving gas from the gas supply into the end assembly and into the inner passageway of the insert and through the hole in the insert and into the chamber; temporarily trapping the gas in the chamber; controlling the gas in the chamber to cool the insert and the contact tip; and moving the gas out of the chamber through the hole in the diffuser sleeve.

Further still, the present invention relates to a method for cooling a contact tip of a welding device which comprises the steps of providing a gas supply; providing a gooseneck having a passageway, a diffuser connected to the diffuser, the diffuser having a wall with a hole and an inner passageway in fluid communication with the passageway, a diffuser sleeve having a first end and a second end with an longitudinal axis extending therebetween, having a wall with a hole and having an inner cavity, the diffuser sleeve connected to gooseneck with the diffuser positioned in the inner cavity and the wall of the diffuser axially adjacent and spaced apart from the wall of the diffuser sleeve forming a chamber positioned between the wall of the diffuser and the wall of the diffuser sleeve with the hole in the wall of the diffuser sleeve and the hole in the wall of the diffuser in fluid communication with the chamber; providing a contact tip in contact with the diffuser; moving gas from the gas supply into the passageway of the gooseneck and into the inner passageway of the diffuser and through the hole in the diffuser and into the chamber; temporarily trapping the gas in the chamber; moving the gas in the chamber to cool the diffuser and the contact tip; and moving the gas out of the chamber through the hole in the diffuser sleeve.

ADD LIMITATIONS OF DEPENDENT CLAIMS

The substance and advantages of the present invention will become increasingly apparent by reference to the following drawings and the description.

BRIEF DESCRIPTION OF THE SEVERAL VIEWS OF THE DRAWINGS

FIG. 5 is a side view of one embodiment of the contact tip 32 showing the radiused first end 32D and the buttress threads 32C adjacent the radiused second end 32D.

FIG. 6 is a is a side view of one embodiment of the insert 40.

FIG. 7 is a perspective view of the embodiment of the insert 40 of FIG. 6.

DETAILED DESCRIPTION OF THE INVENTION

Figure 1:
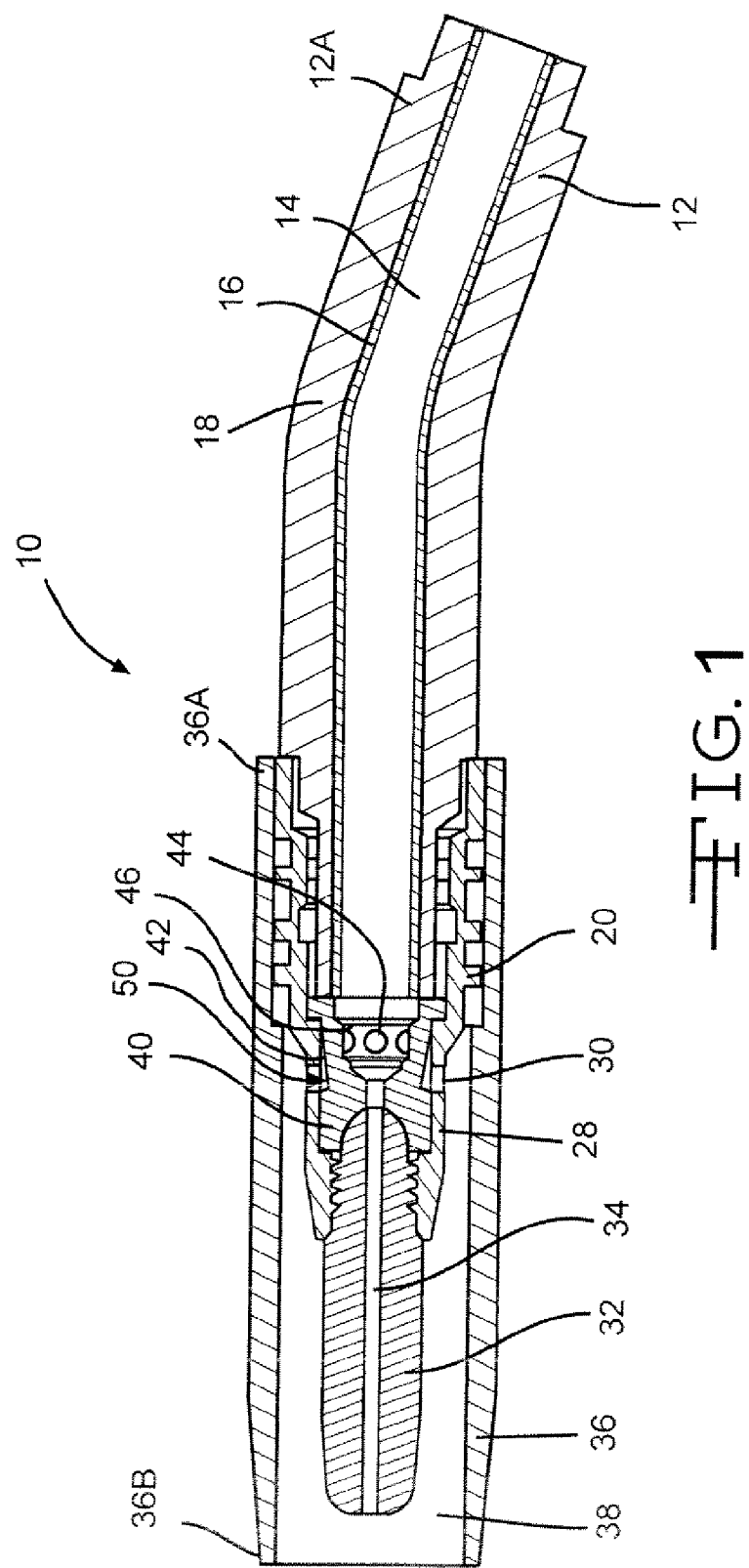
FIG. 1 is a cross section view of one embodiment of the end assembly 10 showing the gooseneck 12, the diffuser sleeve 20, the insert 40, the chamber 50, the contact tip 32 and the nozzle 36.
Figure 2:
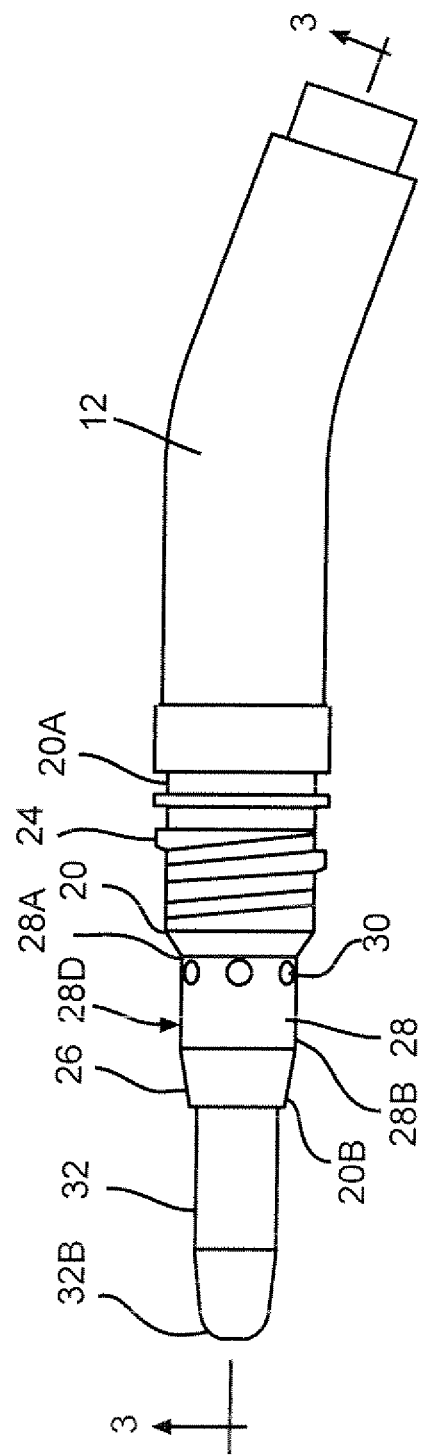
FIG. 2 is a side view of one embodiment of the end assembly 10 without the nozzle 36 showing the gooseneck 12, the diffuser sleeve 20 and the contact tip 32.
Figure 11:
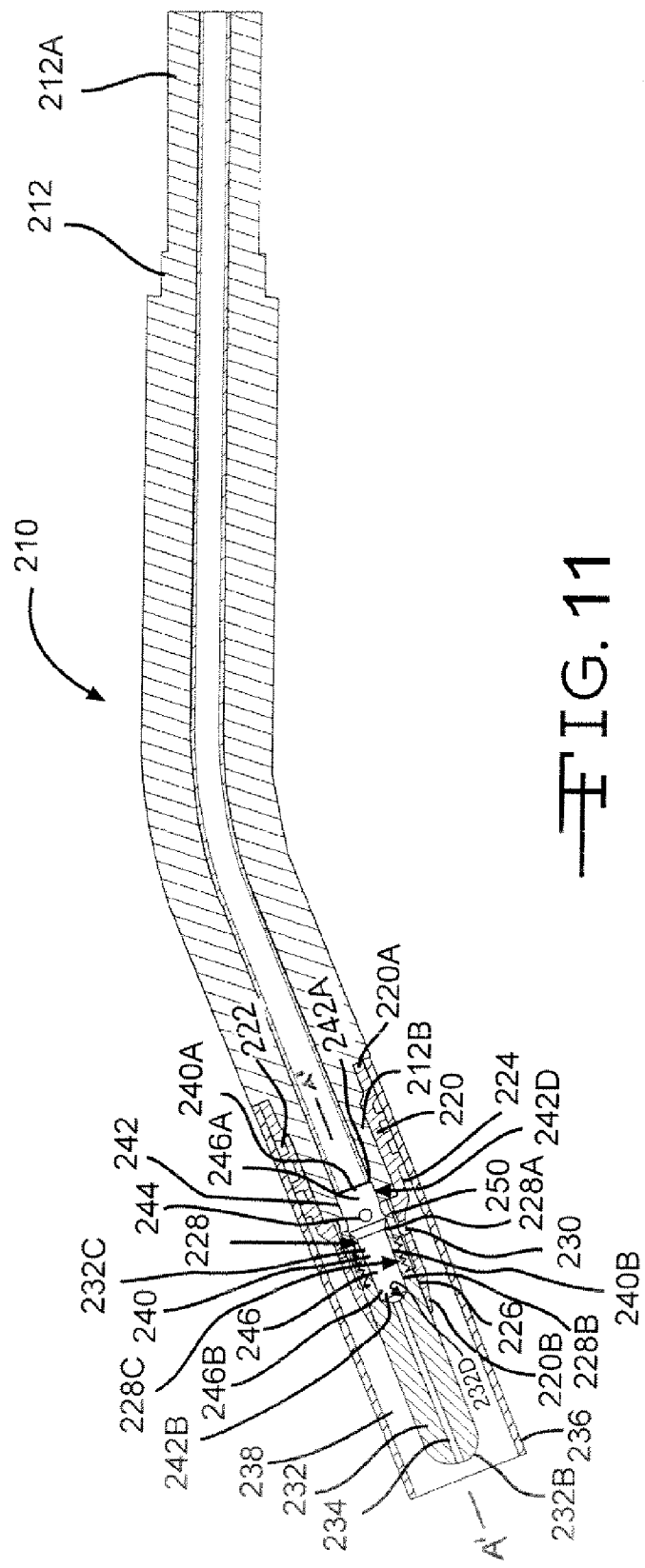
FIG. 11 is a cross section view of an alternate embodiment showing the gooseneck 212, the diffuser 240, the diffuser sleeve 220, the contact tip 232 and the nozzle 236.
Figure 13:
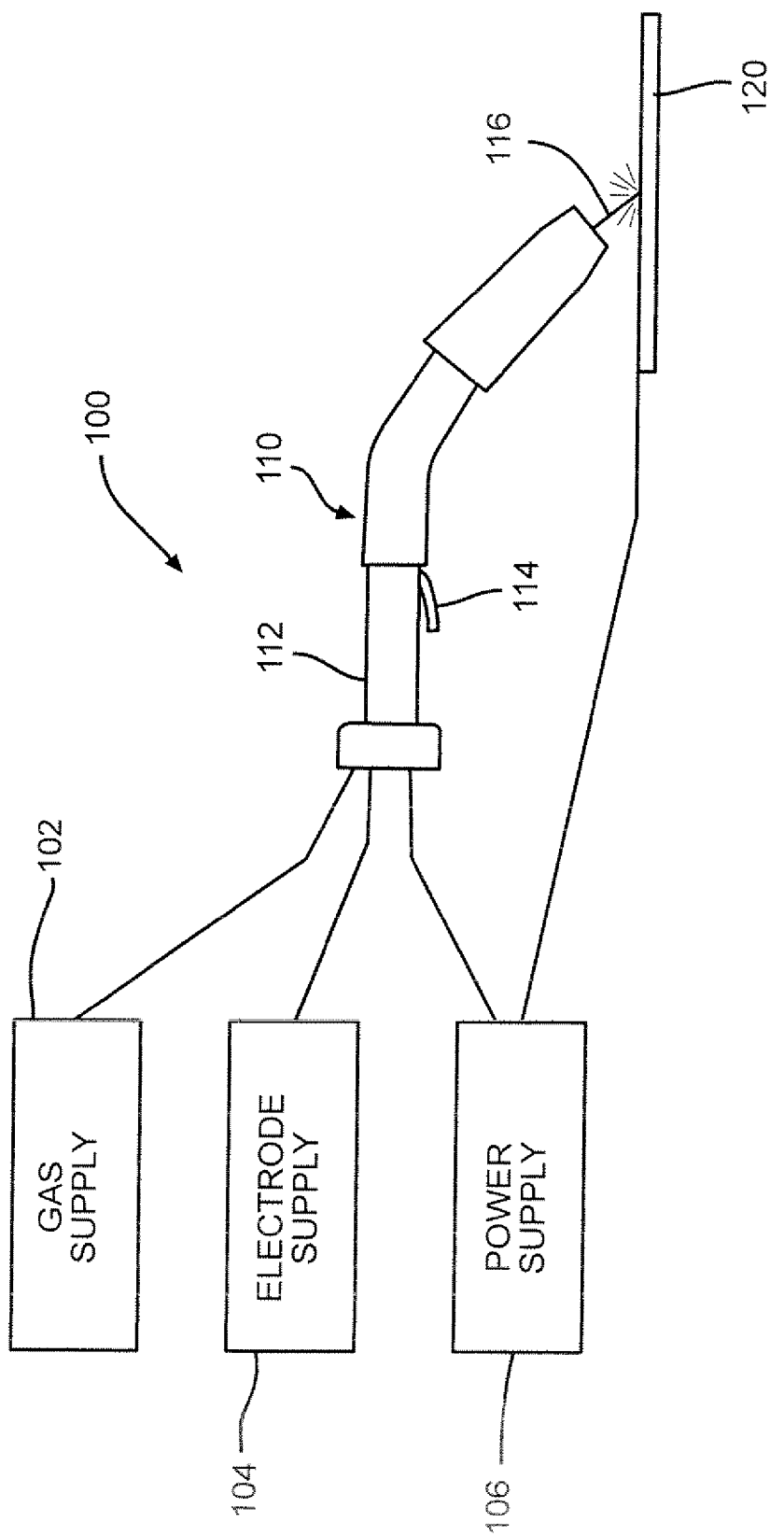
FIG. 13 is a schematic view of a welding system 100 showing the welding device 110 connected to the gas supply 102, the electrode supply 104 and power supply 106.

FIG. 13 is a general, schematic representation of a MIG welding system 100. The welding system 100 includes a gas supply 102, an electrode supply 104, and a power supply 106 connected to a welding device 110. In general the welding device 110 includes a handle 112, a gooseneck 12 or 212 and an end assembly 10 or 210. The welding system 100 also includes an activation switch which, in one embodiment, is trigger 114 on the handle 112 of the welding device 110. It is understood that the welding system 100 can be activated similar to any welding system well known in the art. FIG. 1 shows one embodiment of the first embodiment of the end assembly 10 of the present invention having a gooseneck 12, a diffuser sleeve 20, an insert 40, a contact tip 32 and a nozzle 36. FIG. 11 shows one embodiment of an alternative embodiment of the end assembly 210 of the present invention having a gooseneck 212, a diffuser 240, a diffuser sleeve 220, a contact tip 232 and a nozzle 236.

In the first embodiment of the present invention, the gooseneck 12 has opposed first and second ends 12A and 12B with a passageway 14 extending therebetween. The first end 12A of the gooseneck 12 is connected to the handle 112 of the welding device 110. The gooseneck 12 includes an inner conduit 16 which extends between the ends 12A and 12B and forms the passageway 14. The inner conduit 16 is constructed of a conductive material. In one embodiment, the inner conduit 16 is constructed of copper. In one embodiment, the inner conduit 16 is a flexible cable having a center bore. The gooseneck 12 also includes an outer housing 18 or covering which protects the inner conduit 16. The passageway 14 of the gooseneck 12 is sized to enable the electrode 116 and gas 118 to move through the passageway 14 from the first end 12A to the second end 12B of the gooseneck 12. In one embodiment, the gooseneck 12 is similar to a gooseneck well known in the art.

The diffuser sleeve 20 has opposed first and second ends 20A and 20B with an inner cavity 22 extending therebetween along a longitudinal axis A-A of the diffuser sleeve 20. The first end 20A of the diffuser sleeve 20 is mounted on the second end 12B of the gooseneck 12. The inner cavity 22 extends between the open first end 20A and the open second end 20B. The size and shape of the inner cavity 22 of the diffuser sleeve 20 varies depending on the type of gooseneck 12, the size of the insert 40 and the type of contact tip 32 used in the end assembly 10. In one embodiment, the inner cavity 22 at the first end 22A has an essentially cylindrical shape to connect to the essentially cylindrical shaped second end 12B of the gooseneck 12. In one embodiment, the inner cavity 22 adjacent the first end 20A of the diffuser sleeve 20 has threads and the outer surface of the second end 12B of the gooseneck 12 has threads and the diffuser sleeve 20 is threadably connected to the second end 12B of the gooseneck 12. In one embodiment, the second end 12B of the gooseneck 12 is press fit into the inner cavity 22 of the diffuser sleeve 20 at the first end 20A. It is understood that the diffuser sleeve 20 can be secured on the second end 12B of the gooseneck 12 by any means well known in the art. The diffuser sleeve 20 includes a first portion 24 adjacent the first end 20A and a second portion 26 adjacent the second end 20B with a wall 28 extending between the first portion 26 and the second portion 28. In one embodiment, the diameter of the second portion 28 of the diffuser sleeve 20 is less than the diameter of the first portion 26 of the diffuser sleeve 20. The wall 28 has a first end 28A adjacent the first portion 24 of the diffuser sleeve 20 and a second end 28B adjacent the second portion 26 of the diffuser sleeve 20 with an inner surface 28C and an outer surface 28D extending between the ends 28A and 28B with a length between the ends 28A and 28B extending along the longitudinal axis A-A of the diffuser sleeve 20. In one embodiment, an inner surface 28C of the wall 28 is tapered. In one embodiment, a thickness of the wall 28 along the length of the diffuser sleeve 20 is constant. In one embodiment, the thickness of the wall 28 varies along the length. In one embodiment, the inner cavity 22 along the length of the wall 28 has a cylindrical shape. In one embodiment, the wall 28 is tapered such that the thickness of the wall 28 increases along the length of the wall 28 from the first end 28A adjacent the first portion 26 to the second end 28B adjacent the second portion 28 of the diffuser sleeve 20. The wall 28 has a least on hole 30. In one embodiment, the wall 28 has a plurality of holes 30 spaced around the perimeter of the wall 28. The holes 30 in the wall 28 are in fluid communication with the inner cavity 22. In one embodiment, the holes 30 are evenly spaced around the perimeter of the wall 28. In one embodiment, the wall 28 has a cylindrical shape along the length and the holes 30 are spaced around a circumference of the wall 28 along a common plane perpendicular to the longitudinal axis A-A of the diffuser sleeve 20. In one embodiment, the inner cavity 22 adjacent the wall 28 has an essentially cylindrical shape. In one embodiment, the outer surface of the first portion 26 of the diffuser sleeve 20 is provided with threads for mounting the nozzle 36 on the diffuser sleeve 20. In one embodiment the outer surface of first portion 26 of the diffuser sleeve 20 is provided with gripping flats for gripping the diffuser sleeve 20 to secure the diffuser sleeve 20 onto the gooseneck 12. The interior surface of the inner cavity 22 adjacent the second end 20B of the diffuser sleeve 20 has threads 31. In one embodiment, the threads 31 are buttress threads. In one embodiment, the diffuser sleeve 20 is constructed of a non-conductive material. In one embodiment, the diffuser sleeve 20 is constructed of brass. In one embodiment, the diffuser sleeve 20 is constructed of 360 half hard brass. In one embodiment, the diffuser sleeve 20 is constructed of ceramic. In one embodiment, the diffuser sleeve 20 is constructed of a high temperature polymer. In one embodiment, the diffuser sleeve 20 is constructed of a ferrous material. In one embodiment, the diffuser sleeve 20 is constructed of a non-ferrous material.

The contact tip 32 has a first end 32A and a second end 32B with a center bore 34 extending there between. The first end 32B of the contact tip 32 is connected to the second end 20B of the diffuser sleeve 20. The first end 32A of the contact tip 32 extends into the inner cavity 22 of the diffuser sleeve 20 at the second end 20B of the diffuser sleeve 20. The center bore 34 of the contact tip 32 extends along the longitudinal axis of the contact tip 32. When the contact tip 32 is secured in the second end 20B of the diffuser sleeve 20, the center bore 34 of the contact tip 32 is coaxial with the longitudinal axis A-A of the diffuser sleeve 20. In one embodiment, the first end 32A of the contact tip 32 has threads 32C which mate with threads 31 on the interior surface of the inner cavity 22 of the diffuser sleeve 20. In one embodiment, the threads 32C of the contact tip 32 are buttress threads. In one embodiment, the contact tip 32 has four (4) threads. In one embodiment, the buttress threads are American National Standards Institute 45/7 or ANSI 45/7 buttress threads. In one embodiment, the first end 32A of the contact tip 32 has a radiused outer end surface 32D. In one embodiment, the first end 32A of the contact tip 32 is elongated with the threads 32C spaced apart from the first end 32A of the contact tip 32. In one embodiment, the second end 32B of the contact tip 32 is radiused. In one embodiment, the contact tip 32 is constructed of conductive material. In one embodiment, the contact tip 32 is constructed of copper. In one embodiment, the contact tip 32 is constructed of tempered copper. In one embodiment, the contact tip 32 is constructed of deoxidized high phosphorous copper 122 or DHP 122.

The nozzle 36 has a first end 36A and an open second end 36B with a gas channel 38 extending therebetween. The first end 36A of the nozzle 36 is connected to the first portion 24 of the diffuser sleeve 20. When the nozzle 36 is secured on the diffuser sleeve 20, the nozzle 36 extends outward from the first end 36A along the diffuser sleeve 20 toward the second end 36B and toward the second portion 26 of the diffuser sleeve 20 so that the wall 28 of the diffuser sleeve 20 is in the gas channel 38 and the hole 30 in the wall 28 of the diffuser sleeve 20 is in fluid communication with the gas channel 38 of the nozzle 36. The nozzle 36 extends along the contact tip 32 so that the contact tip 32 is in the gas channel 38. In one embodiment, the second end 38B of the nozzle 38 extends beyond the second end 32B of the contact tip 32. In one embodiment, the second end 38B of the nozzle 38 is essentially even with the second end 32B of the contact tip 32. In one embodiment, the second end 32B of the contact tip 32 extends beyond the second end 36B of the nozzle 36. The nozzle 36 is similar to nozzles well known in the art.

Figure 9:
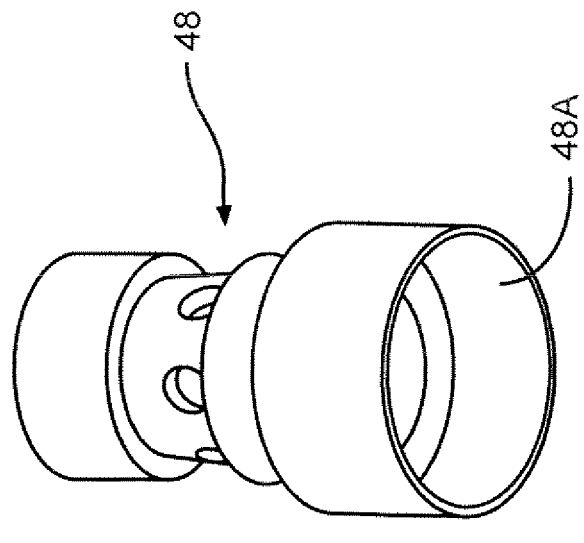
FIG. 9 is a perspective view of the embodiment of the insert 48 of FIG. 9.
Figure 8:
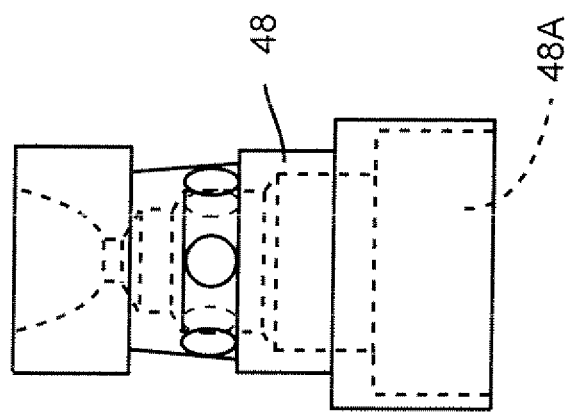
FIG. 8 is a side view of another embodiment of the insert 48.
Figure 10:
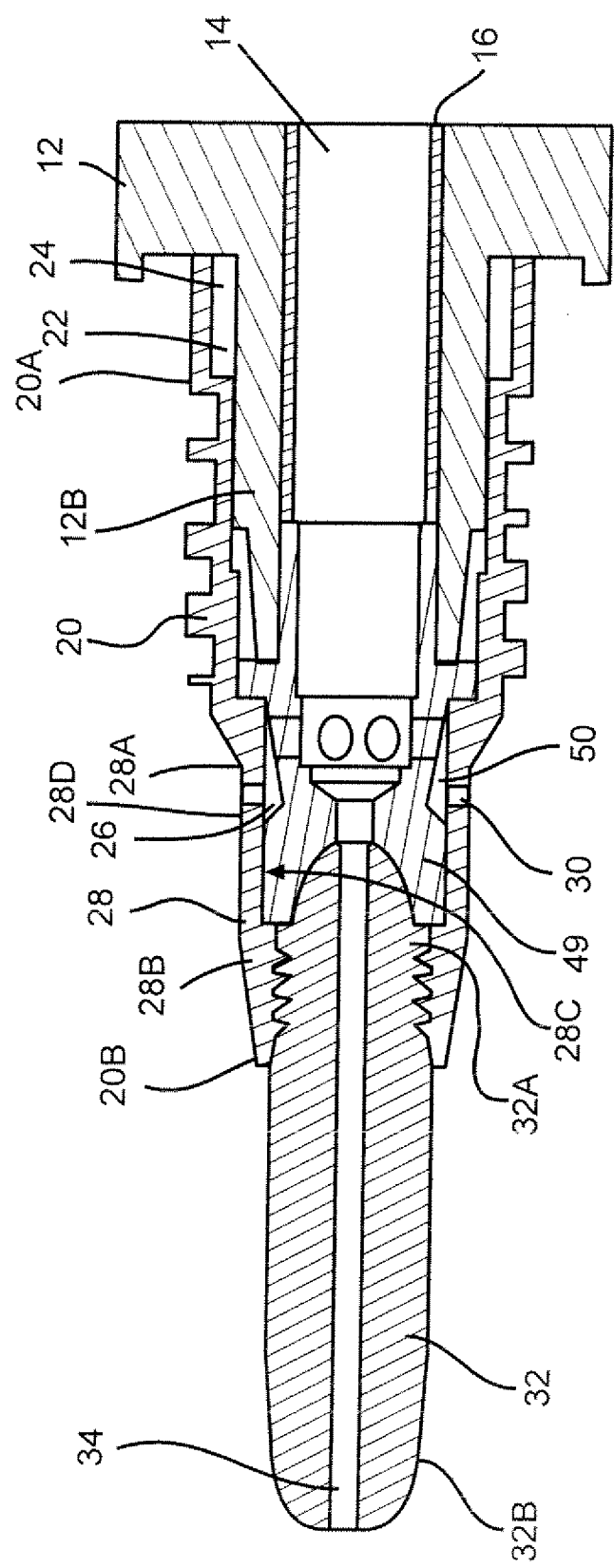
FIG. 10 is a cross section view of another embodiment of the end assembly 10 without the nozzle 36 showing the second end 12B of the gooseneck 12, the diffuser sleeve 20, the insert 49 and the contact tip 32.

The insert 40 has a first end 40A and a second end 40B with inner passageway 46 extending therebetween. The insert 40 has a first part adjacent the first end 40A and a second part adjacent the second end 40B with a wall 42 extending therebetween. The insert 40 can have a variety of shapes and sizes. The shape of the insert 40 can vary depending on the shape and size of the inner cavity 22 of the diffuser sleeve 20, the shape and size of the second end 12B of the gooseneck 12 and the shape and size of the contact tip 32. The shape and size of the insert 40 can vary depending on the specific use of the welding device 110. In one embodiment, the first part of the insert 40 is cylindrical to enable the second end 12B of the gooseneck 12 to abut against the first end 40A of the insert 40 to secure the insert 40 in position in the diffuser sleeve 20 (FIG. 1). In one embodiment, the first part of the insert 48 has a cylindrical, open first end 48A and the second end 12B of the gooseneck 12 is inserted into the first end 48A of the insert 48 to secure the insert 40 in position in the diffuser sleeve 20 (FIGS. 8 and 9). In another embodiment, the insert 48 has an elongated first part with an exterior shoulder spaced apart from the first end. In this embodiment, the elongated first part of the insert 49 extends into the passageway 14 of the gooseneck 12 and the second end 12B of the gooseneck 12 contacts the shoulder to secure the insert 49 in position in the diffuser sleeve 20 (FIG. 10).

The wall 42 of the insert 40 has a first end 42A adjacent the first part of the insert 40 and a second end 42B adjacent the second part of the insert 40 with an inner surface and an outer surface 42D extending between the ends 42A and 42B. The wall 42 has a length between the ends 42A and 42B extending along the longitudinal axis of the insert 40. In one embodiment, a thickness of the wall 42 along the length of the insert 40 is constant. In one embodiment, the thickness of the wall 42 varies along the length. In one embodiment, the wall 42 is tapered such that the thickness of the wall 42 increases along the length of the wall 42 adjacent the first part to adjacent the second part of the insert 40. In one embodiment, the outer surface 42D of the wall 42 is angled. The wall 42 has at least one hole 44 extending therethrough. In one embodiment, the wall 42 has a plurality of holes 44. In one embodiment, the wall 42 has a cylindrical shape and the holes 44 are spaced apart around a perimeter of the wall 42 of the insert 40. In one embodiment, the holes 44 are evenly spaced around the perimeter of the wall. In one embodiment, the wall 42 has a cylindrical shape along the length and the holes 44 are spaced around a circumference of the wall 42 along a common plane perpendicular to the longitudinal axis of the insert 40. In one embodiment, the inner passageway 46 of the insert 40 extending along the length of the wall 42 has a cylindrical shape. The holes 44 in the wall 42 are in fluid communication with the inner passageway 46 of the insert 40.

The inner passageway 46 of the insert 40 has a first section 46A, a diffuser section 46B and a second section 46C. The first section 46A is adjacent the open, first end 40A of the insert 40. The first section 46A of the inner passageway 46 is adjacent the second end 12B of the gooseneck 12 and in direct communication with the passageway 14 of the gooseneck 12. The shape and size of the first section 46A of the inner passageway 46 can vary depending on the shape and size of the second end 12B of gooseneck 12. The first section 46A of the inner passageway 46 is in fluid communication with the diffuser section 46B of the inner passageway 46. In one embodiment, the diameter of the first section 46A of the inner passageway 46 is greater than or equal to the diameter of the diffuser section 46B so that the gas 118 flows from the passageway 14 of the gooseneck 12 into the first section 46A of the inner passageway 46 and into the diffuser section 46B of the inner passageway 46 of the insert 40. In one embodiment, the wall 42 of the insert 40 extends beyond the diffuser section 46B of the inner passageway 46 to the second section 46C of the inner passageway 46. In one embodiment, the diffuser section 46B has an essentially cylindrical shape. In one embodiment, the size of diffuser section 46B decreases in a direction toward the second section 46C of the inner passageway 46. The diameter of the second section 46C of the inner passageway 46 is less than a diameter of the diffuser section 46B. The diameter of the second section 46C is greater than a diameter of the electrode 116 so that the electrode 116 can extend through the second section 46C into the center bore 34 of the contact tip 32. The second section 46C of the inner passageway 46 of the insert 40 at the second end 40B is coaxial with the center bore 34 of the contact tip 32 to enable the electrode 116 to move smoothly through the inner passageway 46 of the insert 40 into the center bore 34 of the contact tip 32. In one embodiment, the second end 40B of the insert 40 has an indention 40C with an inner surface 40D. In one embodiment, the indention 40 is radiused having a radiused inner surface 40C. In one embodiment, the insert 40 is constructed of a conductive material. In one embodiment, the insert 40 is constructed of copper. In one embodiment, the insert 40 is constructed of tempered copper. In one embodiment, the insert 40 is constructed of C110 copper.

The insert 40 is positioned in the inner cavity 22 of the diffuser sleeve 20 axially spaced between the contact tip 32 and second end 12B of the gooseneck 12. When the insert 40 is secured in the diffuser sleeve 20, the insert 40 is coaxial with the diffuser sleeve 20. The insert 40 is positioned in the inner cavity 22 of the diffuser sleeve 20 so that the wall 42 of the insert 40 is axially adjacent or essentially at the same position along the longitudinal axis A-A of the diffuser sleeve or the longitudinal axis of the end assembly 10 as the wall 28 of the diffuser sleeve 20. The outer surface 42D of the wall 42 of the insert 40 is spaced apart from the inner surface 28C of the wall 28 of the diffuser sleeve 20 forming a chamber 50 positioned between the wall 42 of the insert 40 and the wall 28 of the diffuser sleeve 20. The chamber 50 has a length extending along the longitudinal axis of the end assembly 10. In one embodiment, the outer surface 42D of the wall 42 of the insert 40 is angled along an axial length and the chamber 50 along the length is tapered. In one embodiment, the inner surface 28D of the wall 28 of the diffuser sleeve 20 is angled along an axial length and the chamber 50 is tapered along the length. In one embodiment, the length of the wall 42 of the insert 40 is varied to change the length of the chamber 50. In one embodiment, the length of the wall 28 of the diffuser sleeve 20 is varied to change the length of the chamber 50. In one embodiment, the length of the wall 42 of the insert 40 is not equal to the length of the wall 28 of the diffuser sleeve 20. In one embodiment, a shape of the outer surface 42D of the wall 42 of the insert 40 is varied to change or adjust the shape and size of the chamber 50. In one embodiment, the inner surface 28C of the wall 28 of the diffuser sleeve 20 is varied to change the size and shape of the chamber 50. In one embodiment, the diameter of the chamber 50 adjacent the first end 40A of the insert 40 is less than the diameter of the chamber 50 adjacent the second end 40B of the insert 40. The holes 44 in the wall 42 of the insert 40 and the holes 30 in the wall 28 of the diffuser sleeve 20 are in fluid communication with the chamber 50. In one embodiment, the holes 44 in the wall 42 of the insert 40 are perpendicular to the longitudinal axis of the insert 40. In one embodiment, the holes 44 in the wall 42 of the insert 40 are angled with respect to the longitudinal axis of the insert 40. In one embodiment, the holes 30 in the wall 28 of the diffuser sleeve 20 are perpendicular to the longitudinal axis A-A of the diffuser sleeve 20. In one embodiment, the holes 30 in the wall 28 of the diffuser sleeve 20 are angled with respect to the longitudinal axis A-A of the diffuser sleeve 20. In one embodiment, when the insert 40 is positioned in the diffuser sleeve 20, the holes 44 in the wall 42 of the insert 40 are not axially aligned or are axially misaligned or offset from the holes 30 in the wall 28 of the diffuser sleeve 20. In one embodiment, when the insert 40 is positioned in the diffuser sleeve 20, the holes 44 in the wall 42 of the insert 40 and the holes 30 in the wall 28 of the diffuser sleeve 20 are not in the same plane perpendicular to the longitudinal axis of the end assembly 10. In one embodiment, when the insert 40 is positioned in the diffuser sleeve 20, the holes 44 in the wall 42 of the insert 40 are axially spaced apart from the holes 30 in the wall 28 of the diffuser sleeve 20. In one embodiment, when the insert 40 is positioned in the diffuser sleeve 20, the holes 44 in the wall 42 of the insert 40 are axially positioned between the first end 20A of the diffuser sleeve 20 and the holes 30 in the wall 28 of the diffuser sleeve 20. In another embodiment, when the insert 40 is positioned in the diffuser sleeve 20, the holes 30 in the diffuser sleeve 20 are axially positioned between the first end 20A of the diffuser sleeve 20 and the holes 44 in the wall 42 of the insert 40. In one embodiment, the diameter of the holes 30 in the wall 28 of the diffuser sleeve 20 is greater than the diameter of the holes 44 in the wall 42 of the insert 40. In one embodiment, the diameter of the holes 30 in the wall 28 of the diffuser sleeve 20 is less than the diameter of the holes 44 in the wall 42 of the insert 40. In one embodiment, the diameter of the holes 30 in the wall 28 of the diffuser sleeve 20 is essentially equal to the diameter of the holes 44 in the wall 42 of the insert 40. In one embodiment, the number of holes 30 in the wall 28 of the diffuser sleeve 29 is equal to the number of holes 42 on the wall 42 of the insert 40. In one embodiment, the number of holes 30 in the wall 28 of the diffuser sleeve 20 is less than the number of holes 44 in the wall 42 of the insert 40. In one embodiment, the number of holes 30 in the wall 28 of the diffuser sleeve 20 is greater than the number of holes 44 in wall 42 of the insert 40. It is understood that the number and diameter of the holes 30 in the wall 28 of the diffuser sleeve 20 and number and diameter of the holes 44 in the wall 42 of the insert 40 can vary depending of the use of the welding device 110, the type of gas 118 used during welding, the material used to construct the contact tip 32, the material used to construct the insert 40 and the amount of current used during welding as well as other variables.

In the alternate embodiment of the present invention, the gooseneck 212 has a first end 212A and a second end 212B with an inner conduit 216 extending between the ends 212A and 212B forming the passageway 214. In one embodiment the gooseneck 210 is flexible and the inner conduit 216 is a flexible cable. The inner conduit 216 is constructed of a conductive material. In one embodiment, the inner conduit 216 is constructed of copper. The diffuser 240 is connected to the second end 212B of the gooseneck 212. In one embodiment, the diffuser 240 is separate but in contact with the inner conduit 216 at the second end 212B of the gooseneck 212. In one embodiment, the diffuser 240 is threadably connected to the second end 212B of the gooseneck 212. In one embodiment, the diffuser 240 is an integral part of the inner conduit 216 at the second end 212B of the gooseneck 212. In one embodiment, the diffuser 240 is constructed of the same material as the inner conduit 216. In one embodiment, the diffuser 240 is constructed of a conductive material. In one embodiment, the diffuser 240 is constructed of copper. In one embodiment, the diffuser 240 is constructed of tempered copper.

The diffuser 240 has a first end 240A and a second end 204B with inner passageway 246 and a wall 242 extending therebetween. The first end 240A of the diffuser 240 is connected to the second end 212B of the gooseneck 212. The diffuser 240 can have a variety of shapes and sizes. The shape of the diffuser 240 can vary depending on the shape and size of the inner cavity 222 of the diffuser sleeve 220, the shape and size of the second end 212B of the gooseneck 212 and the shape and size of the contact tip 232. The shape and size of the diffuser 240 can vary depending on the specific use of the welding device 110. The wall 242 has a first end 242A adjacent gooseneck 210 and an opposed second end 242B with an inner surface and an outer surface 242D extending between the ends 242A and 242B. The wall 242 has a length between the ends 242A and 242B extending along the longitudinal axis of the diffuser 240. In one embodiment, a thickness of the wall 242 along the length of the diffuser 240 is constant. In one embodiment, the thickness of the wall 242 varies along the length. In one embodiment, the wall 242 is tapered such that the thickness of the wall 242 decreases along the length of the wall 242 from adjacent the first end 240A to adjacent the second end 204B of the diffuser 240. In one embodiment, the outer surface of the wall 242 is angled. The wall 242 has at least one hole 244 extending therethrough. The hole 244 is in fluid communication with the inner passageway 246 of the diffuser 240. In one embodiment, the wall 242 has a plurality of holes 244. In one embodiment, the wall 242 has a cylindrical shape and the holes 244 are spaced apart around a perimeter of the wall 242 of the diffuser 240. In one embodiment, the holes 244 are evenly spaced around the perimeter of the wall 242. In one embodiment, the wall 424 has a cylindrical shape along the length and the holes 244 are spaced around a circumference of the wall 242 along a common plane perpendicular to the longitudinal axis of the diffuser 240.

The inner passageway 246 of the diffuser 240 has a first, diffuser section 246A adjacent the first end 240A and a second section 246B adjacent the second end 240B of the diffuser 240. The first, diffuser section 246A of the inner passageway 246 is adjacent the second end 212B of the gooseneck 212 and in direct communication with the passageway 214 of the gooseneck 212. The shape and size of the first diffuser section 246A of the inner passageway 246 can vary depending on the shape and size of the second end 212B of gooseneck 212. In one embodiment, the first diffuser section 246A of the inner passageway 246 of the diffuser 240 extends along the length of the wall 242 and has a cylindrical shape. In one embodiment, the diameter of the first diffuser section 246A of the inner passageway 246 is greater than the diameter of the second section 246B of the inner passageway 246. In one embodiment, the size of diffuser section 246A decreases in a direction toward the second section 246B of the diffuser 240. The diameter of the second section 246B is greater than a diameter of the electrode 116 so that the electrode 116 can extend through the second section 246B into the center bore 234 of the contact tip 232. The second section 246B of the inner passageway 246 of the diffuser 240 at the second end 240B is coaxial with the center bore 234 of the contact tip 232 to enable the electrode 116 to move smoothly through the inner passageway 246 of the diffuser 240 into the center bore 234 of the contact tip 232.

The diffuser sleeve 220 of the alternate embodiment is similar to the diffuser sleeve 20 of the first embodiment. The diffuser sleeve 220 has opposed first and second ends 220A and 220B with an inner cavity 222 extending therebetween along a longitudinal axis $A^1$-$A^1$ of the diffuser sleeve 220. The diffuser sleeve 220 has a first portion 224 adjacent the first end 220A and a second portion 226 adjacent the second end 220B with a wall 228 extending between the first portion 226 and the second portion 228. In one embodiment, the diameter of the second portion 226 of the diffuser sleeve 220 is less than the diameter of the first portion 224 of the diffuser sleeve 220. The wall 228 has a first end 228A adjacent the first portion 224 of the diffuser sleeve 220 and a second end 228B adjacent the second portion 226 of the diffuser sleeve 220 with an inner surface 228C and an outer surface 228D extending between the ends 228A and 228B with a length between the ends 228A and 228B extending along the longitudinal axis $A^1$-$A^1$ of the diffuser sleeve 220. In one embodiment, an inner surface 228C of the wall 228 is tapered. In one embodiment, a thickness of the wall 228 along the length of the diffuser sleeve 220 is constant. In one embodiment, the thickness of the wall 228 varies along the length. In one embodiment, the inner cavity 222 along the length of the wall 228 has a cylindrical shape. In one embodiment, the wall 228 is tapered such that the thickness of the wall 228 increases along the length of the wall 228 from the first end 228A adjacent the first portion 224 to the second end 228B adjacent the second portion 226 of the diffuser sleeve 220. The wall 228 has a least one hole 230. In one embodiment, the wall 228 has a plurality of holes 230 spaced around the perimeter of the wall 228. The holes 230 in the wall 228 are in fluid communication with the inner cavity 222. In one embodiment, the holes 230 are evenly spaced around the perimeter of the wall 228. In one embodiment, the wall 228 has a cylindrical shape along the length and the holes 230 are spaced around a circumference of the wall 228 along a common plane perpendicular to the longitudinal axis $A^1$-$A^1$ of the diffuser sleeve 220.

The diffuser sleeve 220 is secured on the second end 212B of the gooseneck 212 so that the second end 212B of the gooseneck 212 extends into the inner cavity 222 at the first end 220A of the diffuser sleeve 220. It is understood that the diffuser sleeve 220 can be secured on the second end 212B of the gooseneck 212 by any means well known in the art. The diffuser sleeve 220 is positioned on the second end 212B of the gooseneck 212 so that the wall 228 of the diffuser sleeve 220 is axially adjacent the wall 242 of the diffuser 240 or essentially at the same position along the longitudinal axis $A^1$-$A^1$ of the diffuser sleeve 220 or the longitudinal axis of the end assembly 210 as the wall 228 of the diffuser sleeve 220. When the diffuser sleeve 220 is secured on the gooseneck 212, the wall 228 of the diffuser sleeve 220 is spaced apart from the wall 242 of the diffuser 240 forming a chamber 250 positioned between the wall 228 of the diffuser sleeve 220 and the wall 242 of the diffuser 240. The outer surface 242D of the wall 242 of the diffuser 240 is spaced apart from the inner surface 228C of the wall 228 of the diffuser sleeve 220 forming the chamber 250. In one embodiment, the outer surface 242D of the wall 242 of the diffuser 240 is angled along an axial length so that the chamber 250 is tapered along the length. In one embodiment, the length of the wall 242 of the diffuser 240 is varied to change the length of the chamber 250. In one embodiment, the length of the wall 228 of the diffuser sleeve 220 is varied to change the length of the chamber 250. In one embodiment, the length of the wall 242 of the diffuser 240 is not equal to the length of the wall 228 of the diffuser sleeve 220. In one embodiment, the shape of the outer surface 242D of the wall 242 of the diffuser 240 is varied to change or adjust the shape and size of the chamber 250. In one embodiment, the inner surface 228C of the wall 228 of the diffuser sleeve 220 is varied to change a size and shape of the chamber 220. In one embodiment, the chamber 250 extends along the longitudinal axis $A^1$-$A^1$ of the diffuser sleeve 220 and the diameter of the chamber 250 adjacent the first end 240A of the diffuser 240 is less than the diameter of the chamber 250 adjacent the second end 240B of the diffuser 240. The holes 244 in the wall 242 of the diffuser 240 and the holes 230 in the wall 228 of the diffuser sleeve 220 are in fluid communication with the chamber 250. In one embodiment, the holes 244 in the wall 242 of the diffuser 240 are perpendicular to the longitudinal axis $A^1$-$A^1$ of the diffuser 240. In one embodiment, the holes 244 in the wall 242 of the diffuser 240 are angled with respect to the longitudinal axis $A^1$-$A^1$ of the diffuser 240. In one embodiment, the diffuser 240 is positioned in the diffuser sleeve 220 so that the holes 244 in the wall 242 of the diffuser 240 are not axially aligned or are axially misaligned of axially offset with the holes 230 in the wall 228 of the diffuser sleeve 220. In one embodiment, when the diffuser 240 is positioned in the diffuser sleeve 220, the holes 244 in the wall 242 of the diffuser 240 and the holes 230 in the wall 228 of the diffuser sleeve 220 are not in the same plane perpendicular to the longitudinal axis of the end assembly 210. In one embodiment, when the diffuser 240 is positioned in the diffuser sleeve 20, the holes 244 in the wall 242 of the diffuser 240 are axially spaced apart from the holes 230 in the wall 228 of the diffuser sleeve 20. In one embodiment, when the diffuser 240 is positioned in the diffuser sleeve 220, the holes 244 in the wall 242 of the diffuser 240 are axially positioned between the first end 220A of the diffuser sleeve 220 and the holes 230 in the wall 228 of the diffuser sleeve 220. In another embodiment, when the diffuser 240 is positioned in the diffuser sleeve 220, the holes 230 in the wall 228 of the diffuser sleeve 220 are axially positioned between the first end 220A of the diffuser sleeve 220 and the holes 244 in the wall 242 of the diffuser 240. In one embodiment, the diameter of the holes 230 in the wall 228 of the diffuser sleeve 220 is greater than the diameter of the holes 244 in the wall 242 of the diffuser 240. In one embodiment, the diameter of the holes 230 in the wall 228 of the diffuser sleeve 220 is less than the diameter of the holes 244 in the wall 242 of the diffuser 240. In one embodiment, the diameter of the holes 230 in the wall 228 of the diffuser sleeve 220 is essentially equal to the diameter of the holes 244 in the wall 242 of the diffuser 240. In one embodiment, the number of holes 230 in the wall 228 of the diffuser sleeve 220 is equal to the number of holes 244 in the diffuser 240. In one embodiment, the number of holes 230 in the wall 228 of the diffuser sleeve 220 is less than the number of holes 244 in the wall 242 of the diffuser 240. In one embodiment, the number of holes 230 in the wall 228 of the diffuser sleeve 220 is greater than the number of holes 244 in the wall 242 of the diffuser 240. It is understood that the number and diameter of the holes 230 in the wall 228 of the diffuser sleeve 220 and number and diameter of the holes 244 in the wall 242 of the diffuser 240 can vary depending of the use of the welding device 110, the type of gas 118 used during welding, the material used to construct the contact tip 232, the material used to construct the diffuser 240 and the amount of current used during welding as well as other variables. In one embodiment, the inner cavity 222 adjacent the wall 242 has an essentially cylindrical shape. In one embodiment, the diffuser sleeve 220 is constructed of a nonconductive material. In one embodiment, the diffuser sleeve 220 is constructed of brass. In one embodiment, the diffuser sleeve 220 is constructed of 360 half hard brass. In one embodiment, the diffuser sleeve 220 is constructed of ceramic. In one embodiment, the diffuser sleeve 220 is constructed of a high temperature polymer. In one embodiment, the diffuser sleeve 20 is constructed of a ferrous material. In one embodiment, the diffuser sleeve 20 is constructed of a non-ferrous material.

The contact tip 232 of the alternate embodiment is similar to the contact tip 32 of the first embodiment. The contact tip 232 is connected at the first end 232A to the second end 220B of the diffuser sleeve 220. The contact tip 232 can be secured to the diffuser sleeve 220 by any means well known in the art. In one embodiment of the alternate embodiment, the contact tip 232 extends into the inner cavity 222 of the diffuser sleeve 220 at the second end 220B of the diffuser sleeve 220. In one embodiment, the first end 232A of the contact tip 232 has an indention 232C having an inner surface 232D and the second end 240B of the diffuser 240 of the gooseneck 210 extends into the first end 232A of the contact tip 232 (FIG. 11). The contact tip 232 is secured in contact with the diffuser 240 of the gooseneck 210 by the diffuser sleeve 220. In one embodiment, the inner surface of the inner cavity 222 of the diffuser sleeve 220 at the second end 220B has threads which mate with threads on the first end 232A of the contact tip 232. In one embodiment, the contact tip 232 is constructed of conductive material. In one embodiment, the contact tip 232 is constructed of copper. In one embodiment, the contact tip 232 is constructed of tempered copper. In one embodiment, the contact tip 232 is constructed of deoxidized high phosphorous copper 122 or DHP 122.

The nozzle 236 has a first end 236A and an open second end 236B with a gas channel 238 extending therebetween. The first end 236A of the nozzle 236 is connected to the first portion 224 of the diffuser sleeve 220 by any means well known in the art. When the nozzle 236 is secured on the diffuser sleeve 220, the nozzle 236 extends outward from the first end 236A along the diffuser sleeve 220 toward the second end 236B and toward the second portion 226 of the diffuser sleeve 220 so that the wall 228 of the diffuser sleeve 220 is in the gas channel 238 and the hole 230 in the wall 228 of the diffuser sleeve 220 is in fluid communication with the gas channel 238 of the nozzle 236. The nozzle 236 extends along the contact tip 232 so that the contact tip 232 is in the gas channel 238. In one embodiment, the second end 238B of the nozzle 238 extends beyond the second end 232B of the contact tip 232. In one embodiment, the second end 238B of the nozzle 238 is essentially even with the second end 232B of the contact tip 232. In one embodiment, the second end 232B of the contact tip 232 extends beyond the second end 236B of the nozzle 236. The nozzle 236 is similar to nozzles well known in the art.

In the first embodiment of the present invention, the end assembly 10 is assembled so that the second end 12B of the gooseneck 12 is securely held in the inner cavity 22 of the diffuser sleeve 20 at the first end 20A and the contact tip 32 is securely held in the inner cavity 22 of the diffuser sleeve 20 at the second end 20B with the insert 40 spaced therebetween. The second end 12B of the gooseneck 12, the diffuser sleeve 20, the insert 40 and the contact tip 32, when secured together share a common axis forming the longitudinal axis of the end assembly 10 which is substantially the longitudinal axis A-A of the diffuser sleeve 20. The diffuser sleeve 20 is connected to the second end 12B of the gooseneck 12 by any means well known in the art. In one embodiment, the second end 12B of the gooseneck 12 is force fit into the inner cavity 22 at the first end 20A of the diffuser sleeve 20. The contact tip 32 is connected to the second end 20B of the diffuser sleeve 20 by any of means well known in the art. In one embodiment, the inner cavity 22 of the diffuser sleeve 20 at the second end 22B has threads 31 and the first end 32A of the contact tip 32 has threads 32C and the contact tip 32 is threadably secured in the inner cavity 22 of the diffuser sleeve 20. In one embodiment, where the threads 31 and 32C are buttress threads. In one embodiment, the buttress threads 31 are created in the inner cavity 22 of the diffuser sleeve 20 by tapping the diffuser sleeve 20 from the first end 20A prior to positioning of the insert 40 in the inner cavity 22 of the diffuser sleeve 20. In one embodiment, there are four (4) buttress threads and the insert 40 is rotated four (4) times to secure or remove the contact tip 32 from the diffuser sleeve 20. The use of buttress enables less turns of the contact tip 32 to secure the contact tip 32 in the diffuser sleeve 20. The insert 40 is positioned and secured in the inner cavity of the diffuser sleeve 20 spaced between the second end 12B of the gooseneck 12 and first end 32A of the contact tip 32. The insert 40 is positioned in the inner cavity 22 of the diffuser sleeve 20 with the wall 42 of the insert 40 axially adjacent the wall 28 of the diffuser sleeve 20. The insert 40 can be secured in the inner cavity 22 by any means well known in the art. In one embodiment, the insert 40 is press fit in the inner cavity 22 of the diffuser sleeve 20. The insert 40 is in contact with the second end 12B of the gooseneck 12 and the first end 32A of the contact tip 32. In one embodiment, where the contact tip 32 has a radiused end surface 32D and the insert 40 has the indention 40C with a radiused inner surface 40D, diffuser sleeve 20 secures the contact tip 32 in contact with the insert 40 so that the radiused end surface 32D of the contact tip extends into the indention 40C in the second end 40B of the insert 40 and contacts the radiused inner surface 40D of the insert 40 to increase the surface contact area between the insert 40 and the contact tip 32. The first end 36A of the nozzle 36 is connected to the diffuser sleeve 20 by any means well known in the art. The nozzle 36 is connected to the first portion of the diffuser sleeve 20 and extends outward towards the second end 32B of the contact tip 32. In one embodiment, the second end 36B of the nozzle 36 is essentially even with the second end 32B of the contact tip 32. However, it is understood that the second end 36B of the nozzle 36 can extend beyond the second end 32B of the contact tip 32 or the second end 32B of the contact tip 32 can extend beyond the second end 36B of the nozzle 36.

In one embodiment, the second end 12B of the gooseneck 12 is constructed of a conductive material, the insert 40 is constructed of a conductive material, the contact tip 32 is constructed of a conductive material and the diffuser sleeve 20 is constructed of a non-conductive material. In one embodiment, the second end 12B of the gooseneck 12 is constructed of copper, the insert 40 is constructed of copper, the contact tip 32 is constructed of copper and the diffuser sleeve 20 is constructed of brass. The diffuser sleeve 20 ensures a secure and tight fit between the gooseneck 12, the insert 40 and the contact tip 32 and ensures constant contact between the second end 12B of the gooseneck 12, the insert 40 and the contact tip 32 during use of the welding device 110. In one embodiment, the second end 12B of the gooseneck 12 is formed by the inner conduit 16, and the inner conduit 16 is constructed of a conductive material and the inner conduit 16 is in contact with the insert 40. In one embodiment, the second end 12B of the gooseneck 12 is formed by the inner conduit 16, and the inner conduit 16 is constructed of copper and the inner conduit 16 is in contact with the insert 40.

In the alternate embodiment where the diffuser 240 is connected to the second end 212B of the gooseneck 212, the second end 212B of the gooseneck 212 having the diffuser 240 is inserted into the inner cavity 222 of the diffuser sleeve 220 at the first end 220A and moved into the inner cavity 222 until the wall 242 of the diffuser 240 is axially adjacent the wall 228 of the diffuser sleeve 220. In this embodiment, the diffuser sleeve 220 can be secured on the second end 212B of the gooseneck 212 by any means well known in the art. In one embodiment, the inner cavity 222 at the first end 220A of the diffuser sleeve 220 has threads and second end 212B of the gooseneck 220 has threads and the threads of the gooseneck 212 threadably mate with the threads of the diffuser sleeve 220 to securely hold the gooseneck in the diffuser sleeve. The contact tip 232 is inserted into the inner cavity 222 of the diffuser sleeve 220 from the open second end 220B of the diffuser sleeve 220. The contact tip 232 can be secured in the diffuser sleeve 220 by any means well known in the art. In one embodiment, the inner cavity 222 at the second end 220B of the diffuser sleeve 220 has threads and first end 232A of the contact tip 232 has threads and the threads of the contact tip 232 threadably mate with the threads of the diffuser sleeve 220 to securely hold the contact tip in the diffuser sleeve 220. In one embodiment, the diffuser 240 is constructed of a conductive material, the contact tip 232 is constructed of a conductive material and the diffuser sleeve 220 is constructed of a non-conductive material. In one embodiment, the diffuser 240 is constructed of copper, the contact tip 232 is constructed of copper and the diffuser sleeve 220 is constructed of brass. The diffuser sleeve 220 ensures a secure and tight fit between the gooseneck 212 and the contact tip 232 and enables constant contact between the diffuser 240 of the gooseneck 212 and the contact tip 232 during use of the welding device 110. In one embodiment, the diffuser 240 is formed in the end of the inner conduit 216 and the inner conduit 216 is constructed of a conductive material and the inner conduit 216 is in contact with the contact tip 232. In one embodiment, the diffuser 240 is formed in the end of the inner conduit 216 and the inner conduit 216 is constructed of conductive material and the inner conduit 216 is in contact with the contact tip 232. In one embodiment, the diffuser 240 is formed in the end of the inner conduit 216 and the inner conduit 216 is constructed of copper and the inner conduit 216 is in contact with the contact tip 232.

Figure 12:
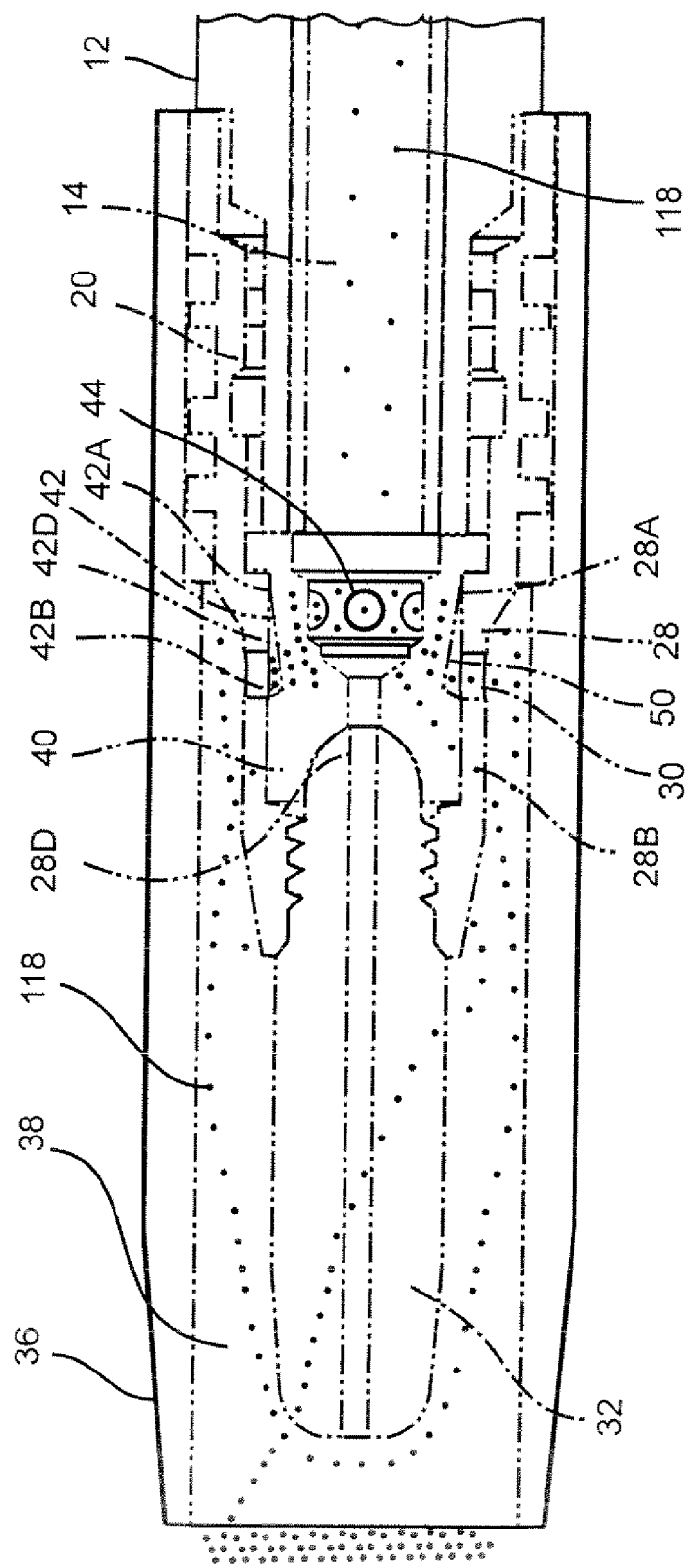
FIG. 12 is a cross section view of one embodiment of an end assembly 10 showing the flow of gas 118.

The end assembly 10 of the present invention is secured to the welding device 110 for use in a welding system 100. The welding system 100 is activated such that the electrode 116 moves from the electrode supply 104 through the passageway of the gooseneck 12 through the inner passageway of the insert 40 and through the center bore of the contact tip toward the workpiece 120. In the alternate embodiment, the electrode 116 moves through the passageway 214 of the gooseneck 212 through the diffuser 240 and through the center bore 234 of the contact tip 232 toward the workpiece 120. In one embodiment, the electrode 116 is a weld wire similar to weld wires well known in the art. As the electrode 116 moves through the end assembly 10, the gas 118 flows from the gas supply 102 through the passageway 14 of the gooseneck 12 to the inner passageway 46 of the insert 40. The gas 118 flows from the first section 46A of the inner passageway 46 into the diffuser section 46B of the inner passageway 46 of the insert 40. The gas 118 exits the diffuser section 46B and flows out the hole or holes 44 in the wall 42 of the insert 40 into the chamber 50. In the alternate embodiment, the gas 118 flows from the gas supply 102 through the passageway 214 of the gooseneck 212 into the inner passageway 246 of the diffuser 240 and exits through the inner passageway 246 through the hole or holes 244 in the wall 242 of the diffuser 240 into the chamber 250. In both embodiments, the gas 118 is trapped or temporarily held in the chamber 50 or 250 before exiting the chamber 50 or 250 through the hole or holes 30 or 230 in the wall 28 or 228 of the diffuser sleeve 20 or 22 and into the gas channel 38 or 238 of the nozzle 36 or 236. The gas 118 flows along the gas channel 38 or 238 of the nozzle 36 or 236 to the open, second end 36B or 236B of the nozzle 36 or 236 and around electrode 116 and the weld puddle on the workpiece 120. The size and the shape of the chamber 50 or 250, the positioning, the number and the diameter of the hole or holes 44 in the wall 42 of the insert 40, or in the alternate embodiment the hole or holes 244 in the wall 242 of the diffuser 240, and the positioning, the number and the diameter of the hole or holes 30 or 230 in the wall 28 or 228 of the diffuser sleeve 20 or 220 can be adjusted or changed to control the movement of the gas 118 trapped in the chamber 50 or 250 and the flow of gas 118 exiting the chamber 50 or 250. In one embodiment, the size and shape of the chamber 50 or 250, the positioning, the number and the diameter of the hole or holes 44 in the wall 42 of the insert 40, or in the alternate embodiment the hole or holes 244 in the wall 242 of the diffuser 240, and the positioning, the number and the diameter of the hole or holes 30 or 230 in the wall 28 or 228 of the diffuser sleeve 20 or 220 are adjusted or changed to control the velocity of the gas 118 in the chamber 50 or 250. In one embodiment, the size and shape of the chamber 50 or 250, the positioning, the number and the diameter of the hole or holes 44 in the wall 42 of the insert 40, or in the alternate embodiment the hole or holes 244 in the wall 242 of the diffuser 240, and the positioning, the number and the diameter of the hole or holes 30 or 230 in the wall 28 or 228 of the diffuser sleeve 20 or 220 are adjusted or changed to control the velocity of the gas 118 exiting the chamber 50 or 250. In one embodiment, increasing a length of the chamber 50 or 250 increases the velocity of the gas 118 held in the chamber 50 and 250. In one embodiment, the chamber 50 or 250 is tapered along the length so that a size or diameter of the chamber 50 or 250 adjacent the first end 20A or 220A of the diffuser sleeve 20 or 220 is smaller or less than or size or diameter of the chamber 50 or 250 adjacent the second end 20B or 220B of the diffuser sleeve 20 or 220. By controlling the movement of the gas 118 trapped in the chamber 50 or 250 and by controlling the flow of gas 118 exiting the chamber 50 or 250 into the gas channel 38 or 238 of the nozzle 36 or 236, the flow of gas 118 around the contact tip 32 or 232 and exiting the open, second end 36B or 236B of the nozzle 36 or 236 is controlled. In one embodiment, the velocity of the gas 118 exiting the chamber 50 or 250 into the gas channel 38 or 238 of the nozzle 36 or 236 is greater than the velocity of the gas 118 entering the chamber 50 or 250. By trapping or holding the gas 118 in the chamber 50 or 250 and controlling the movement of the gas 118 in the chamber 50 or 250, the flow of gas 118 through the gas channel 38 or 238 of the nozzle 36 or 236 is less turbulent which results in less turbulence in the flow of gas 118 exiting the second end 36B or 236B of the nozzle 36 or 236 which results in a less turbulence and a more controlled flow of gas 118 around the weld puddle (FIG. 12). Controlling the flow of gas 118 around the weld puddle produces a more controlled atmosphere around the weld puddle which reduces the introduction of contaminants into the flow of gas 118 and into the weld puddle which produces a better weld. The flow of gas 118 in the end assembly 10 or 210 is controlled such that the flow of gas 118 is evenly distributed around the contact tip 32 or 232 as the gas 118 moves through the gas channel 38 or 238 of the nozzle 36 or 236 which allows for an even distribution of gas 118 out the second end 36B or 236B of the nozzle 36 or 236 and around the electrode 116 and the weld puddle. Controlling the flow of gas 118 also reduces the amount of gas 118 used during welding. In one embodiment, the second end 32B or 232B of the contact tip 32 or 232 is rounded which results in less disturbance of the flow of gas 118 as it exits the second end 36B or 236B of the nozzle 36 or 236 which results in less turbulence and more controlled flow of gas 118 around the weld puddle. Trapping or holding the gas 118 in the chamber 50 or 250 around the insert 40 or in the alternate embodiment around the diffuser 240, also acts to cool the insert 40 or diffuser 240 and the contact tip 32 or 232. Cooling of the contact tip 32 or 232 slows the annealing of the contact tip 32 or 232 which results in a longer useful life for the contact tip 32 or 232.

In one embodiment, the second end 12B of the gooseneck 12, the insert 40 and the contact tip 32 are constructed of a conductive material and the diffuser sleeve 20 is constructed of a non-conductive material. In one embodiment, the second end 12B of the gooseneck 12, the insert 40 and the contact tip 32 are constructed of copper and the diffuser sleeve 20 is constructed of a non-conductive material. In one embodiment the second end 12B of the gooseneck 12, the insert 40 and the contact tip 32 are constructed of copper and the diffuser sleeve 20 is constructed of brass. The diffuser sleeve 20 securely holds the contact tip 32 in contact with the insert 40 and the insert 40 in contact with the second end 12B of the gooseneck 12 during use of the welding device 110. The diffuser sleeve 20 securely holds the contact tip 32, insert 40 and second end 12B of the gooseneck 12 in position which allows for good conductivity between second end 12B of the gooseneck 12, the insert 40 and the contact tip 32. The gas 118 trapped in the chamber 50 around the wall 42 of the insert 40 cools the insert 40 which reduces the temperature of the insert 40 and the contact tip 32 and prevents the insert 40 and contact tip 32 from fusing together. The cooling of the insert 40 by the gas 118 trapped in the chamber 50 also pulls heat away from the contact tip 32 which is in contact with the insert 40 which reduces the heat of the contact tip 32 during use and extends the life of the contact tip 32.

In one embodiment of the alternate embodiment, the diffuser 240 and the contact tip 232 are constructed of a conductive material and the diffuser sleeve 220 is constructed of a non-conductive material. In one embodiment of the alternate embodiment, the diffuser 240 and the contact tip 232 are constructed of copper and the diffuser sleeve 220 is constructed of a non-conductive material. In one embodiment of the alternate embodiment, the diffuser 240 and the contact tip 232 are constructed of copper and the diffuser sleeve 220 is constructed of a brass. The diffuser sleeve 220 securely holds the contact tip 232 in contact with the diffuser 240 allowing for good conductivity between diffuser 240 and the contact tip 232 during use of the welding device 110. The gas 118 trapped in the chamber 250 acts to cool the diffuser 240 which reduces the heat of the diffuser 240 and prevents the diffuser 240 and the contact tip 232 from fusing together. The gas 118 trapped in the chamber 250 cools the diffuser 240 and pulls heat away from the contact tip 232 which is in contact with the diffuser 240 which reduces the heat of the contact tip 232 during use and extends the life of the contact tip 232.

Figure 3:
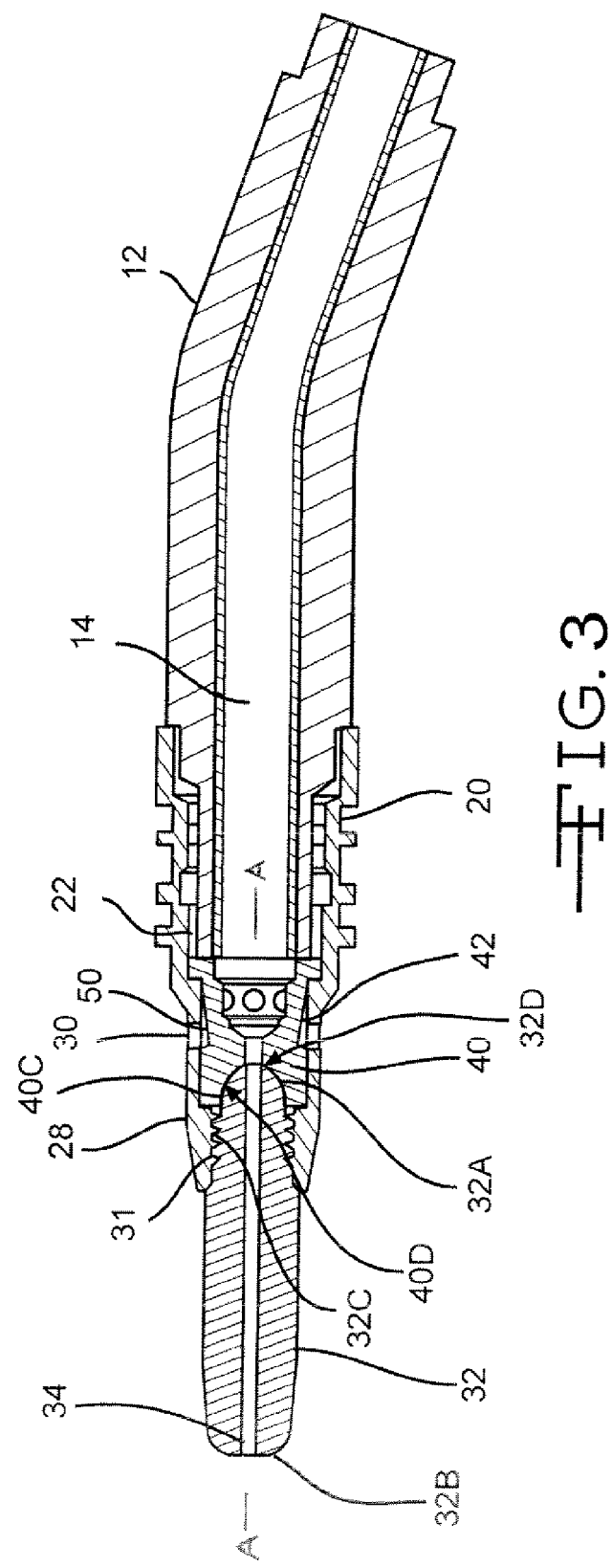
FIG. 3 is a cross section view of the end assembly 10 of FIG. 2 along the line 3-3 showing the chamber 50 between the diffuser sleeve 20 and insert 40.
Figure 4:
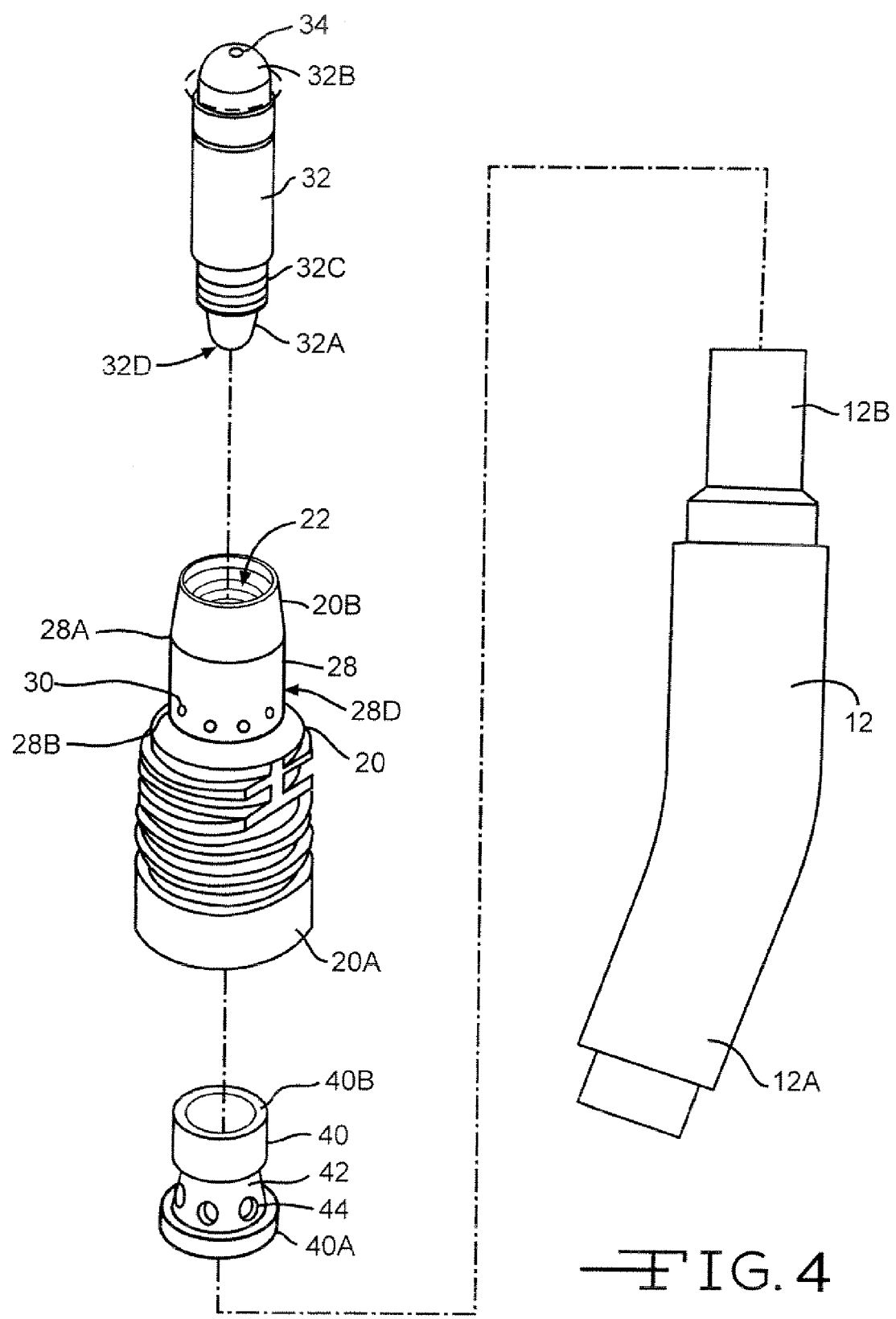
FIG. 4 is a exploded view of the end assembly 10 of FIG. 2.

Increasing the contact area between the contact tip 32 and the insert 40, or the diffuser 240 in the alternate embodiment, increases the cooling effect of the trapped gas 118 on the contact tip 32 or 232 through the insert 40 or the diffuser 240. In the embodiment where the contact tip 32 has a radiused end surface 32D and the insert 40 has the indention 40C with a radiused inner surface 40D, diffuser sleeve 20 secures the contact tip 32 in contact with the insert 40 so that the radiused end surface 32D of the contact tip 32 extends into the indention 40C in the second end 40B of the insert 40 and contacts the radiused inner surface 40D of the insert 40 to increase the surface contact area between the insert 40 and the contact tip 32 (FIG. 3). In the alternate embodiment where the diffuser 240 extends into the indention 232C in the first end 232A of the contact tip 232 such that the end surface of the diffuser 240 is in contact with the inner surface 232D of the indention 232C of the contact tip 232, the increased surface contact between the diffuser 240 and the contact tip 232 assists in moving the heat away from the contact tip 232 through the diffuser 240 as the gas 118 trapped in the chamber 250 cools the diffuser 240 which prevents the contact tip 232 from fusing with the diffuser 240 (FIG. 11).

In the embodiment where the second end 12B of the gooseneck 12, the insert 40 and the contact tip 32 are constructed of a conductive material with the gooseneck 12, the insert 40 and the contact tip 32 securely held together in constant contact by the diffuser sleeve 20 constructed of a non-conductive material, the flow of current though the electrode 116 from the power supply 106 to the workpiece 120 has less resistance which reduces the amount of energy used during the welding process. Similarly in the alternate embodiment where the diffuser 240 and the contact tip 232 are constructed of a conductive material and are securely held in constant contact by the diffuser sleeve 220 constructed of a non-conductive material, the flow of current though the electrode 116 from the power supply 106 to the workpiece 120 has less resistance which reduces the amount of energy used during the welding process. Constructing the insert 40 or in the alternate embodiment constructing the diffuser 240 from a conductive material provides better conductivity throughout the end assembly 10 or 210 allowing for a consistence flow of current through the end assembly 10 or 210 which reduces impedance during the welding and allows for consistent arc starting and results in less false arc starts. Reducing false arc starts and ensuring good, clean arc starting results in more efficient welding and less energy usage during welding. Constructing the insert 40 or in the alternate embodiment constructing the diffuser 240 from a conductive material also provides less resistance to the current flow which allows for higher current flow through the end assembly 10 or 210 before overheating of the end assembly 10 or 210 which acts to reduce damage to the end assembly 10 or 210 during high welding.

In the foregoing description, various features of the present invention are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. An end assembly for a welding device comprising
a) a gooseneck of the welding device having a passageway;
b) a diffuser sleeve having a first end and a second end with an longitudinal axis extending therebetween, having an inner cavity and having a wall having a hole, the diffuser sleeve connected to the gooseneck,
c) an insert having an inner passageway and a wall having a hole, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber;
d) a contact tip positioned in the inner cavity of the diffuser sleeve so that the contact tip extends into the inner cavity of the diffuser sleeve and extends outward from the diffuser sleeve in a direction opposite the insert; and
e) a nozzle having a gas channel and connected to the diffuser sleeve, the nozzle extending outward from the diffuser sleeve in a direction opposite the gooseneck.

2. The end assembly of claim 1 wherein the hole in the wall of the diffuser sleeve is axially misaligned with the hole in the wall of the insert.

3. The end assembly of claim 1 wherein a diameter of the hole in the wall of the diffuser sleeve is greater than a diameter of the hole in the wall of the insert.

4. The end assembly of claim 1 wherein the chamber has opposed first and second ends with a length between ends and wherein a size of the chamber varies along the length.

5. The end assembly of claim 1 wherein the size of the chamber at the first end is less than the size of the chamber at the second end.

6. The end assembly of claim 5 wherein the first end of the chamber is adjacent the gooseneck.

7. The end assembly of claim 1 wherein the wall of the insert has an outer surface and wherein the outer surface of the wall is angled.

8. The end assembly of claim 1 wherein the chamber has opposed first and second ends extending along the axis of the diffuser sleeve with a length between ends and wherein a diameter of the chamber varies along the length.

9. The end assembly of claim 1 wherein the second end of the insert has an indention with a radiused inner surface and the contact tip having a first end with a radiused end surface wherein the first end of the contact tip extends into the indention in the second end of the insert so that the radiused end surface of the contact tip abuts the radiused inner surface of the insert.

10. The end assembly of claim 1 wherein the insert is constructed of a conductive material, the contact tip is constructed of a conductive material and the diffuser sleeve is constructed of a non-conductive material and wherein the insert is in contact with the contact tip.

11. The end assembly of claim 1 wherein the gooseneck extends into the inner cavity of the diffuser sleeve at the first end of the diffuser sleeve and wherein the inner cavity of the diffuser sleeve has threads adjacent the second end and wherein the contact tip is threaded into the inner cavity of the diffuser sleeve at the second end of the diffuser sleeve.

12. The end assembly of claim 8 wherein a diameter of the chamber at the first end is greater than a diameter of the chamber at the second end.

13. The end assembly of claim 2 wherein the insert is constructed of copper, the contact tip is constructed on copper and the diffuser sleeve is constructed of brass and wherein the insert is in contact with the contact tip.

14. The end assembly of claim 11 wherein the insert is axially positioned in the inner cavity of the diffuser sleeve between the gooseneck and the contact tip.

15. The end assembly of claim 12 wherein the first end of the chamber is adjacent the gooseneck.

16. The end assembly of claim 10 wherein an end of the gooseneck is constructed of a conductive material and extends into the inner cavity of the diffuser sleeve and into contact with the insert.

17. The end assembly of claim 16 wherein the insert is constructed of copper, the contact tip is constructed of copper, the end of the gooseneck is constructed of copper and the diffuser sleeve is constructed of brass and the end of the gooseneck extends into the inner cavity of the diffuser sleeve and into contact with the insert and the insert is in contact with the contact tip.

18. The end assembly of claim 17 wherein the gooseneck has an inner conduit constructed of copper and wherein the inner conduit is in contact with the insert.

19. The end assembly of claim 18 wherein the gooseneck extends into the inner cavity of the diffuser sleeve at the first end of the diffuser sleeve and wherein the inner cavity of the diffuser sleeve has threads adjacent the second end of the diffuser sleeve and wherein the contact tip is threaded into the inner cavity of the diffuser sleeve at the second end of the diffuser sleeve.

20. The end assembly of claim 13 wherein the gooseneck has an inner conduit constructed of copper and wherein the inner conduit is in contact with the insert.

21. The end assembly of claim 20 wherein the gooseneck extends into the inner cavity of the diffuser sleeve at the first end of the diffuser sleeve and wherein the inner cavity of the diffuser sleeve has threads adjacent the second end and wherein the contact tip is threaded into the inner cavity of the diffuser sleeve at the second end of the diffuser sleeve.

22. The end assembly of claim 14 wherein the insert is axially secured and fixed in the inner cavity of the diffuser sleeve between the gooseneck and the contact tip.

23. The end assembly of claim 22 wherein the insert has a first end and a second end and wherein the gooseneck contacts the first end of the insert and the contact tip contacts the second end of the insert.

24. The end assembly of claim 23 wherein the insert is constructed of copper, the contact tip is constructed of copper and the diffuser sleeve is constructed of brass and wherein the insert is in contact with the contact tip.

25. The end assembly of claim 24 wherein the gooseneck has an inner conduit constructed of copper and wherein the inner conduit is in contact with the insert.

26. In a combination of a contact tip and a diffuser assembly for a welding device, the combination comprising:

a) the diffuser assembly of the welding device having a diffuser sleeve having a first end and a second end with an longitudinal axis extending therebetween, having a wall with a hole and having an inner cavity, the diffuser assembly having an insert with a first end and a second end, the second end having an indention with a radiused inner surface, the insert having a wall with a hole and having an inner passageway, the insert positioned in the inner cavity of the diffuser sleeve with the wall of the insert axially adjacent and spaced apart from the wall of the diffuser sleeve forming a chamber positioned between the wall of the insert and the wall of the diffuser sleeve so that the hole in the wall of the diffuser sleeve and the hole in the wall of the insert are in fluid communication with the chamber; and b) the contact tip having a first end and a second end with a center bore extending therethrough, the first end having a radiused outer surface, the contact tip inserted in the inner cavity of the diffuser sleeve at the second end of the diffuser sleeve so that the outer surface of the first end of the contact tip extends into the indention in the second end of the insert and the outer surface of the first end of the contact tip abuts the inner surface of the insert and the center bore of the contact tip is aligned with the inner passageway of the insert.

27. The combination of claim 26 wherein inner cavity of the diffuser sleeve at the second end is configured to receive buttress threads, wherein the first end of the contact tip has buttress threads and wherein the contact tip is threaded into the inner cavity of the diffuser sleeve.

28. The combination of claim 26 wherein the hole in the wall of the diffuser sleeve is axially misaligned with the hole in the wall of the insert.

29. The combination of claim 26 wherein a diameter of the hole in the wall of the diffuser sleeve is greater than a diameter of the hole in the wall of the insert.

30. The combination of claim 26 wherein the chamber has opposed first and second ends with a length between ends and wherein a size of the chamber varies along the length.

31. The combination of claim 26 wherein the wall of the insert has an outer surface and wherein the outer surface of the wall is angled.

32. The combination of claim 26 wherein the chamber has opposed first and second ends extending along the axis of the diffuser sleeve with a length between ends and wherein a diameter of the chamber varies along the length.

33. The combination of claim 26 wherein the insert is constructed of copper, the contact tip is constructed of copper and the diffuser sleeve is constructed of brass.

34. The combination of claim 33 wherein the welding device has a gooseneck having an end constructed of copper, wherein gooseneck extends into the inner cavity of the diffuser sleeve at the first end of the diffuser sleeve and wherein the end of the gooseneck contacts the insert.

35. The combination of claim 34 wherein the insert is axially positioned in the inner cavity of the diffuser sleeve between the end of the gooseneck and the contact tip.

\* \* \* \* \*